US010972696B1

(12) United States Patent
Mischel, Jr. et al.

(10) Patent No.: US 10,972,696 B1
(45) Date of Patent: Apr. 6, 2021

(54) UNIVERSAL MIRROR TV AND FLAT PANEL DISPLAY COVER

(71) Applicant: ELECTRIC MIRROR, LLC, Everett, WA (US)

(72) Inventors: James V. Mischel, Jr., Seattle, WA (US); Thomas A Horst, Everett, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 0 days.

(21) Appl. No.: 15/585,060

(22) Filed: May 2, 2017

Related U.S. Application Data

(60) Provisional application No. 62/331,375, filed on May 3, 2016.

(51) Int. Cl.
H04N 19/52 (2014.01)
H04N 5/655 (2006.01)
H04N 5/65 (2006.01)
G02B 17/00 (2006.01)
A47G 1/02 (2006.01)
F16M 13/02 (2006.01)
H04N 5/64 (2006.01)

(52) U.S. Cl.
CPC ............. H04N 5/655 (2013.01); A47G 1/02 (2013.01); F16M 13/022 (2013.01); G02B 17/00 (2013.01); H04N 5/65 (2013.01); A47G 2200/143 (2013.01); H04N 5/642 (2013.01)

(58) Field of Classification Search
CPC .. G02F 1/172; G02F 1/133555; G06F 1/1607; H04L 63/0457; B29C 45/14639; B29C 48/256; G02B 5/0242
See application file for complete search history.

(56) References Cited

U.S. PATENT DOCUMENTS

| 4,989,933 | A | * | 2/1991 | Duguay | G02B 5/0242 359/599 |
| 2001/0037593 | A1 | * | 11/2001 | Korpai | G06F 1/1607 40/594 |
| 2002/0003571 | A1 | * | 1/2002 | Schofield | B60C 23/00 348/148 |
| 2002/0096807 | A1 | * | 7/2002 | Kondou | B29C 48/256 264/532 |
| 2004/0119920 | A1 | * | 6/2004 | Uesaka | G02F 1/133555 349/114 |

(Continued)

Primary Examiner — Tracy Y. Li
(74) Attorney, Agent, or Firm — Peloquin, PLLC; Mark S. Peloquin, Esq.

(57) ABSTRACT

A reflective cover for a flat panel display includes a surface which is both reflective and transmissive. The cover includes a perimeter frame which is configured to couple to the surface around a perimeter of the surface. The perimeter frame further includes an engagement device. The engagement device is attached to the perimeter frame. The engagement device is configured to engage with a mounting bracket. A blackout shroud is coupled to the perimeter frame to form an opening. The opening is sized so that during mounting, the flat panel display is inserted into the opening and the engagement device engages with the mounting bracket. In operation, when the flat panel display is in an on state images displayed thereon are visible through the surface and when the flat panel display is in an off state a reflection is provided from the surface.

49 Claims, 16 Drawing Sheets

(56) References Cited

U.S. PATENT DOCUMENTS

| | | | |
|---|---|---|---|
| 2010/0078343 A1* | 4/2010 | Hoellwarth | B29C 45/14639 206/320 |
| 2011/0186718 A1* | 8/2011 | Tanaka | G01D 5/34 250/231.1 |
| 2013/0182311 A1* | 7/2013 | Mochizuki | G02F 1/172 359/296 |
| 2014/0281559 A1* | 9/2014 | Trachtenberg | H04L 63/0457 713/178 |

* cited by examiner

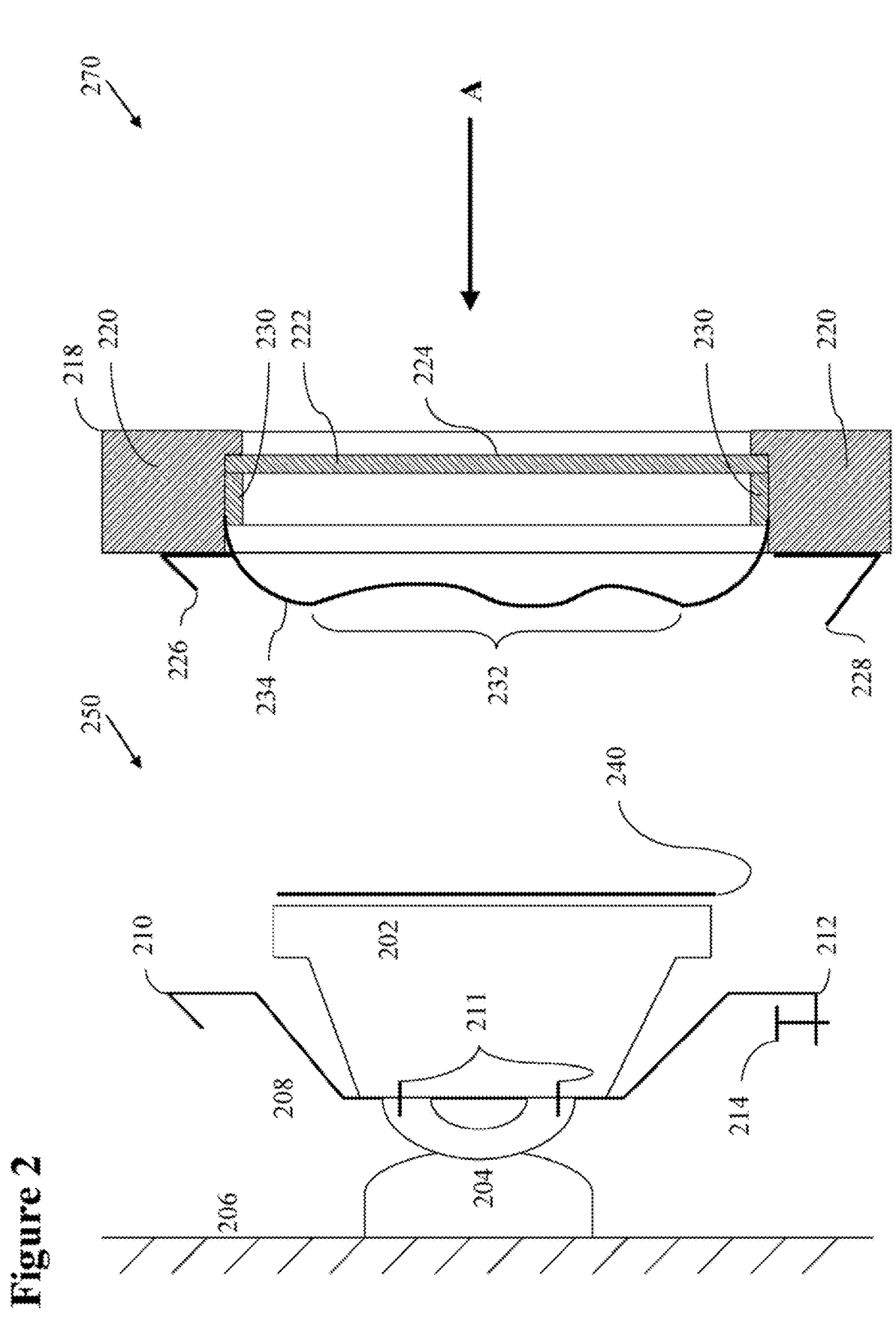

UNIVERSAL MIRROR TV AND FLAT PANEL DISPLAY COVER

RELATED APPLICATIONS

This patent application claims priority from U.S. Provisional Patent Application titled "Universal Mirror TV And Flat Panel Display Cover," filed on May 3, 2016, Ser. No. 62/331,375.

U.S. Provisional Patent Application Ser. No. 62/331,375 is hereby incorporated by reference.

BACKGROUND OF THE INVENTION

1. Field of Invention

The invention relates generally to flat panel displays, and more specifically to apparatuses and methods for providing an alternative use for flat panel displays.

2. Art Background

Flat panel displays are used widely in home, office, and commercial settings, such as hospitality settings for example, hotels, motels, etc. Flat panel displays have become very large and often can occupy a large section of a wall on which one is mounted. The wall is often dominated by the footprint of the display. The flat panel display is not useful when the flat panel display is in an off state and a flat panel display is not always in an on state. As such, when the flat panel display is in an off state, the display is black and the wall space occupied by the display is not useful. This can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2 illustrates installing a flat panel display cover on a flat panel display, according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

System and methods are described for a flat panel display cover that permits a flat panel display to become a mirror when the flat panel display is in an off state and to permit the images from the flat panel display to be seen when the flat panel display is switched to an on state. In various embodiments, the flat panel display cover is a universal flat panel display cover or referred to alternatively as a universal TV cover which can be installed over flat panel displays having different thickness and different height and width dimensions.

Figure 1A:
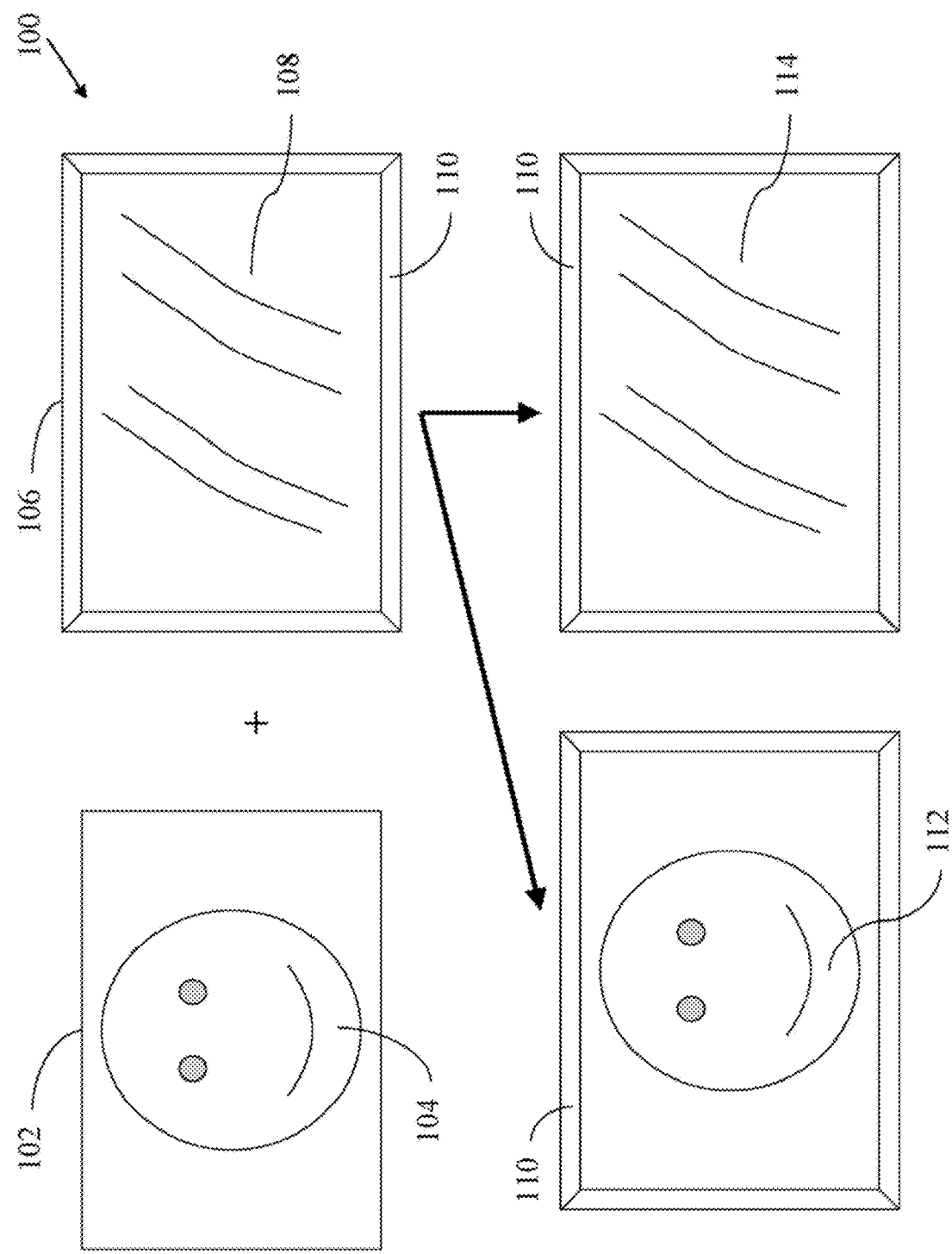
FIG. 1A illustrates a flat panel display cover which also functions as a mirror, according to embodiments of the invention.

FIG. 1A illustrates, generally at 100, a cover which also functions as a mirror, according to embodiments of the invention. With reference to FIG. 1A, a flat panel display is indicated at 102. Flat panel display 102 displays images 104 on a front side of the display. In various embodiments, a flat panel display cover 106 (alternatively referred to herein as a "reflective cover" or a "mirror TV cover") is configured with a surface 108 and a perimeter frame 110. The surface 108 can be made from a variety of different materials; however the objective of the surface 108 is to provide both reflection of incident light and transmission of light. The flat panel display cover 106 is installed on the flat panel display 102, thereby effectively placing the flat panel display in a light box which substantially prevents light from entering from the sides and the back side of the flat panel display 102. Once installed, the assembly provides two modes of operation. The first mode of operation is TV mode, where in an on state; images displayed on the flat panel display 102 are visible as indicated at 112. The second mode of operation is MIRROR mode, where in an off state; images from the flat panel display are not displayed but instead the assembly presents the appearance of a mirror to a person viewing him or herself from a front side of the reflective cover.

Embodiments of the invention are capable of being used with any size flat panel display. Non-limiting examples of displays range in size from very small displays which are on the order of several inches to large displays which are tens of feet in length and width. In some embodiments, the flat panel display cover is larger than the flat panel display. In such cases when the flat panel display is in an on state the TV images are displayed on a portion of the surface and a "gap" or region of mirror extends around the perimeter of the flat panel display cover. In yet other embodiments, the TV images are displayed on a portion of the surface and the rest of the surface performs the mirror function.

Figure 1B:
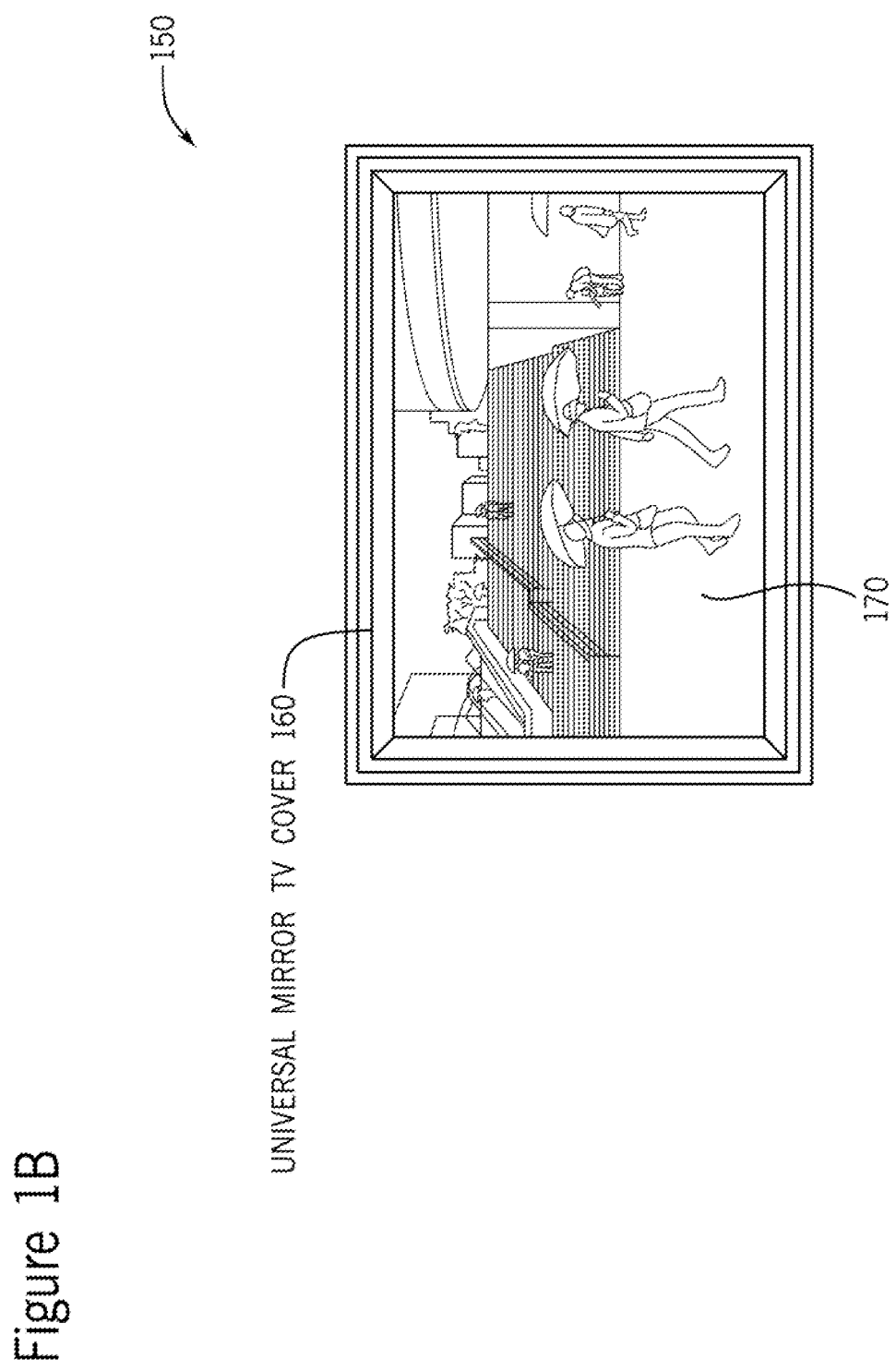
FIG. 1B and FIG. 1C illustrate another flat panel display cover which also functions as a mirror, according to embodiments of the invention.
Figure 1C:
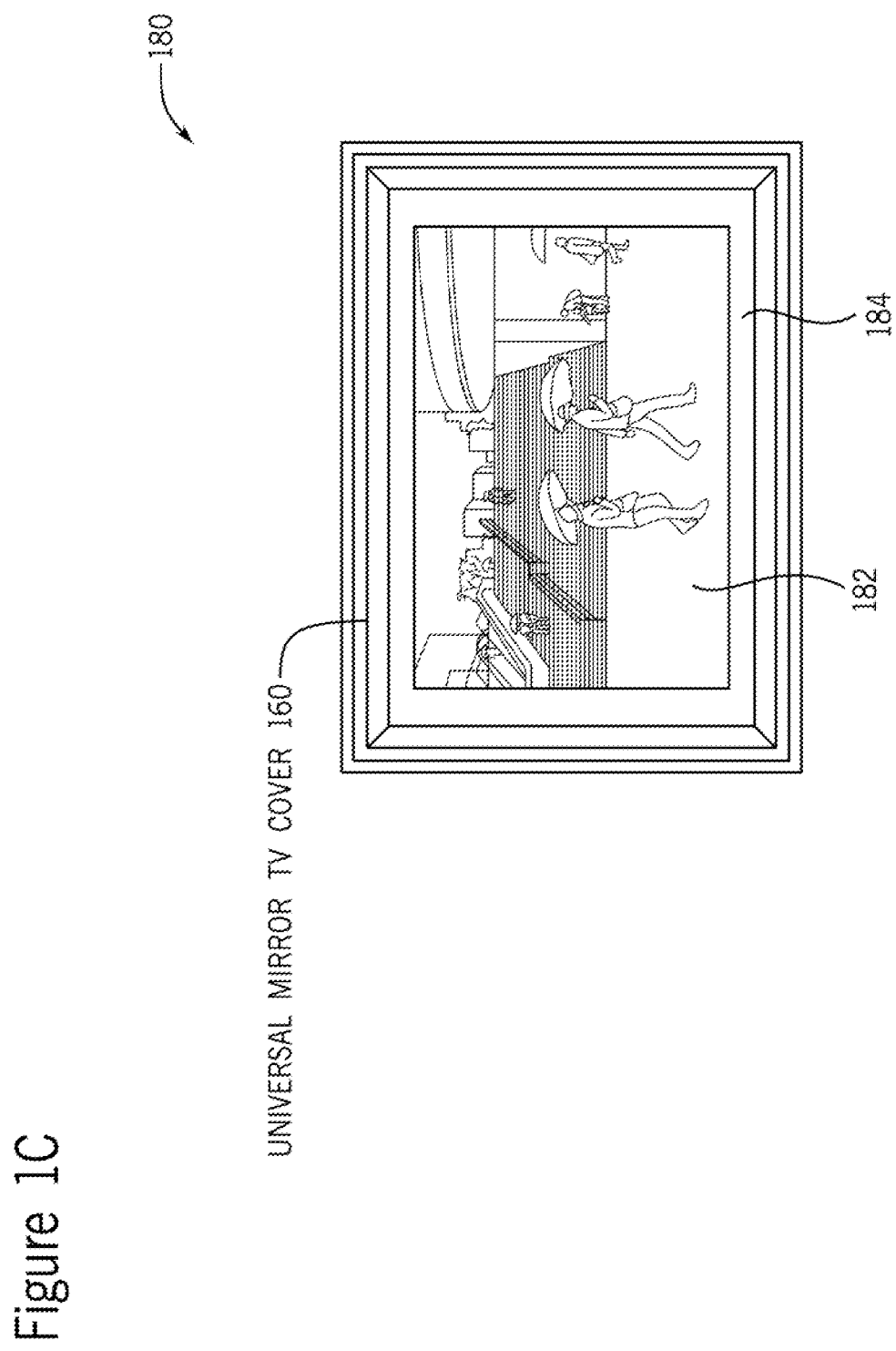

FIG. 1B illustrates, generally at 150, another cover which also functions as a mirror, according to embodiments of the invention. With reference to FIG. 15, a universal mirror TV cover is illustrated at 160. The universal mirror TV cover displays television images as shown at 170 when the flat panel display is in an on state. When the flat panel display is in an off state, the surface functions as a mirror. Alternatively, in various embodiments, when the flat panel display is smaller than the surface of the mirror TV cover, as illustrated in FIG. 1C at 180, the TV images are displayed at 182 and a portion 184 of the surface still functions as a mirror when the flat panel display is in an on state. The portion 184 need not be of constant width, and the illustration in FIG. 1C is merely a non-limiting example.

FIG. 2 illustrates installing a flat panel display cover on a flat panel display, according to embodiments of the invention. With reference to FIG. 2, at 250 a flat panel display 202 is attached to a wall 206 with a wall mount assembly 204. During installation, mounting screws 211 are loosened but need not be removed. Once mounting screws 211 are loose a gap forms between the wall mount assembly 204 and a back side of the flat panel display 202. The gap facilitates insertion of a mounting bracket 208 therein. In typical installations, two mounting brackets are used in a spaced apart fashion however for simplicity in illustration only one mounting bracket 208 is illustrated in FIG. 2. Two mounting brackets are shown below in conjunction with FIG. 10.

A flat panel display cover 218 is illustrated at 270 in cross-section. A perimeter frame 220 captures a surface 222 which is fixed in place relative to the perimeter frame 220 in various ways. In one or more embodiments, the surface 222 is fixed in place with retaining devices 230. In one or more embodiments, retaining devices 230 are retaining strips. Alternatively, retaining devices 230 are tabs made from metal, plastic, composite, wood, etc. In yet other embodiments, retaining devices 230 are pegs or clips. For simplicity in illustration, retaining devices 230 are represented in the drawings herein as retaining strips; however, no limitation is implied thereby. In other embodiments, described in conjunction with the figures below, the perimeter frame and surface are fixed together using adhesive such as glue, tape, etc. A blackout shroud 234 is mechanically coupled to the flat panel display cover 218 in a variety of ways. In one or more embodiments, the black out shroud 234 is captured between the perimeter frame 220 and the retaining strips 230 around the perimeter of the surface 222 thereby forming an opening 232 of a pocket formed with the blackout shroud 234 and the surface 222. In other embodiments, tape is used to connect the perimeter frame 220 to a perimeter of the flat panel display 202 thereby blocking light from entering around the perimeter of the flat panel display 202. Thus, a light box is provided for the flat panel display 202 once installed within the mirror TV cover 218.

Figure 10:
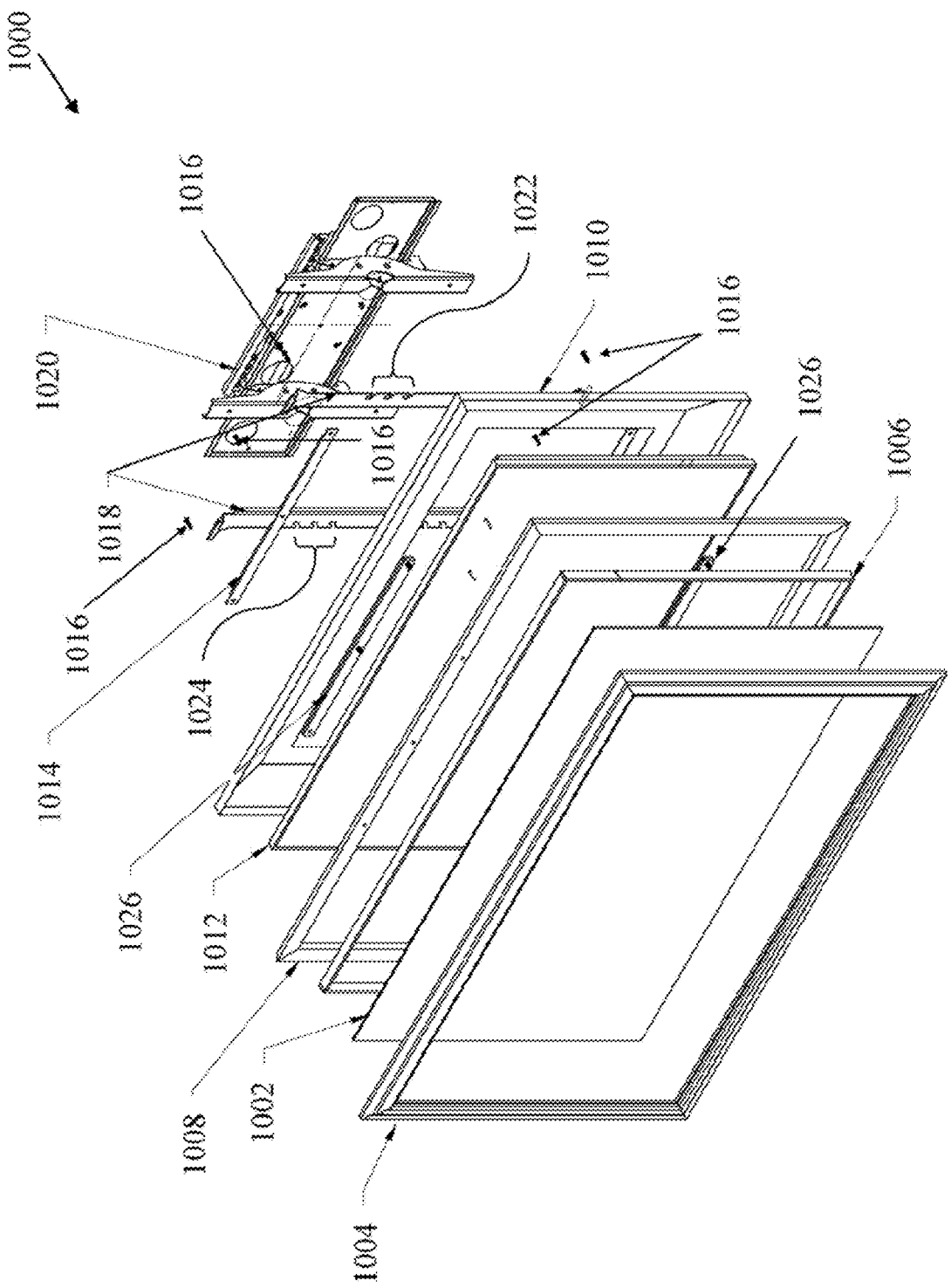
FIG. 10 illustrates an exploded view of a universal flat panel display cover with flat panel display, according to embodiments of the invention.

The flat panel display cover 218 includes an engagement device which has an upper end 226 and a lower end 228. The upper end 226 of the engagement device is designed to releasably engage with the upper end 210 of the mounting bracket 208. In one embodiment, the upper end 226 of the engagement device is configured as a frame clip having a V shape such that when the upper end 226 of the engagement device is placed on the upper end 210 of the mounting bracket 208 the surfaces engage or nest together, thereby preventing slipping in a direction normal to a plane of the mirror TV cover 218 by virtue of the V shapes which nest together. The upper end 226 of the engagement device has a width which extends into the page. A width of an engagement device is illustrated in FIG. 10. The width of the engagement device permits lateral or horizontal motion of the flat panel display cover 218 relative to the flat panel display 202 and is used to center the image produced by the flat panel display 202 with respect to the horizontal dimension of the surface 222.

A lower end 228 of the engagement device is also configured to releasably engage with a lower end 212 of the mounting bracket 208. The lower end 228 of the engagement device swings underneath the lower end of the mounting bracket 212 during installation. These two ends are releasably fixed in place with a mechanism such as a screw 214 which when screwed down contacts the lower end 228 of the engagement device. In one or more embodiments screw 214 is a thumb screw Allen screw, star screw or other releasably engaging mechanism. Once screw 214 is tightened, motion of the lower end 228 of the engagement device is constrained relative to the lower end 212 of the mounting bracket thus releasably locking the flat panel display cover to the mounting brackets 208.

During installation of the flat panel display cover 218, on the flat panel display 202, the flat panel display 202 is inserted into the opening 232 formed in the blackout shroud 234 and the engagement device is mated to the mounting bracket as previously described. The blackout shroud 234 makes contact with the back side of the flat panel display 202 around a perimeter of the flat panel display 202. The insertion of the flat panel display 202 into the opening and engagement with the flat panel display cover 218 effectively places the flat panel display into a light box. The light box substantially prevents light from entering from the sides and back side of the flat panel display. In some embodiments, a strip of tape 240 is applied to a perimeter of the flat panel display 202. The strip of tape covers a bezel of the display. In some embodiments, the tape is a felt tape with the fuzzy side facing the observer. In various embodiments, the tape is a non-glossy tape, low reflectivity tape such as felt tape, which serves to scatter light thereby hiding the presence of the flat panel display when the flat panel display is in an off state.

When an observer views a front side 224 of the surface 222 from a position shown as A in FIG. 2 the combination of the flat panel display cover 218 installed on the flat panel display 202 provides the two modes of operation previously discussed in conjunction with FIG. 1. A first mode of operation, TV mode, where in an on state, images displayed on the flat panel display 102 are visible as indicated at 112 (FIG. 1). The second mode of operation is MIRROR mode, where in an off state, images from the flat panel display are not displayed but instead the assembly presents the appearance of a mirror 114 (FIG. 1) to the observer viewing from a front side at A (FIG. 2).

As used throughout this description of embodiments, a surface is made in a variety of ways. For example, in some embodiments, a surface is made with a layer of glass which is both reflective and transmissive. In applications that have significant ambient light incident on a front side of the flat panel display cover (the viewing side) a reflectivity is sometimes selected to be larger than the transmissivity. In this configuration sufficient light is reflected so that one cannot see through the surface and discern the details of the flat panel display concealed within. Alternatively, when the ambient light is not such a concern, a reflectivity can be lower than the corresponding transmissivity of the glass. Note that by lowering the reflectivity of the glass the flat panel display will appear brighter to an observer observing from the front side (A in FIG. 2). In either case of ambient light level, account is taken of the brightness of the display. In some cases, when the display is not exceptionally bright, it is sometimes desirable to lower the reflectivity of the glass so that the light from the display is not attenuated as much by the surface.

In some embodiments, a 60/40 glass is used which has a reflectivity equal to sixty percent and a transmissivity equal to forty percent. In one or more embodiments, a four millimeter thick 60/40 dielectric coated beam splitter glass is used. In other embodiments, six millimeter thick glass is used. When durability of the flat panel display cover is a design goal, it is often desirable to use a thicker glass for the surface. Glass, referred to as partially silvered glass, can be used for the surface where the partially silvered glass is both reflective and transmissive. In some embodiments, polarized glass is used for the surface. In some embodiments, a polarized film is applied to a glass layer to create the surface.

Alternatively, the surface can be made from materials other than glass. For example, the surface can be made of acrylic plastic sheet or a partially silvered clear plastic sheet of similar thickness to that of glass. In some embodiments, a plastic layer of three to six millimeter in thickness is used. Using plastic for the surface has several advantages, such as, reduced weight relative to glass and resistance to breaking.

In yet other embodiments, the surface is made from stretching a film over a perimeter frame. Films, such as Mylar, can be partially silvered to obtain the combined reflective and transmissive functionality described above for glass. Using a film for the surface presents a very light weight option relative to glass or plastic sheet. In yet other embodiments, a polarized film is used for the surface or a polarized film can be applied to a sheet of plastic to create the surface. In yet other embodiments, a thin film reflective scrim is used for the surface.

The blackout shroud 234 described above in conjunction with FIG. 2, as well as in the figures that follow, is made of a flexible material that permits installation of the flat panel display cover and the flat panel display while substantially preventing ambient light from leaking in around the perimeter of the flat panel display. The blackout shroud is sized to engage with the flat panel display enough to block light while not covering up ventilation holes for cooling.

In some embodiments, the blackout shroud is made of light block material, such as a light block fabric. In other embodiments, the blackout shroud is made with a material possessing elasticity such as an elastic cloth. Elasticity can be imparted through a cloth that incorporates a percentage of an elastic material, such as, spandex (a synthetic fiber know for its elasticity). In general, the elasticity of the material presses the material against the back of the flat panel display thereby preventing the intrusion of light. In other embodiments, the blackout shroud is made out of a material that is affixed to the back of the flat panel display by the use of a hook and loop closure strip, two-way tape or the like. In some embodiments, an opening of the blackout shroud has a pocket formed at the edge of the opening and a string captured in the pocket. After insertion of the flat panel display into the opening of the blackout shroud the string is pulled tightly and tied off thereby pressing the blackout shroud against the back of the flat panel display. The string can be an elastic string which, when pulled tight and tied off, provides elasticity to the blackout shroud even if the blackout shroud is not made from an elastic material in the first instance.

In other embodiments, the blackout shroud is made from an elastic sheet material such as neoprene rubber. Neoprene rubber can be uncoated or bonded to a reinforcing cloth such as nylon cloth.

The perimeter frame 110 (FIG. 1) or 218 (FIG. 2) or perimeter frames shown in the figures below provide a structural function to support the surface and to provide a place of attachment for the engagement device. The perimeter frame can also provide a decorative function (mirror frame) to make the flat panel display cover appear to be a mirror when the flat panel display is in an off state. In some embodiments, a decorative frame is used to provide the decorative appearance of the mirror when the flat panel display is in an off state. In other embodiments, a decorative frame is used in conjunction with a perimeter frame to provide the necessary structure needed to support the surface. In one or more embodiments, a perimeter frame is made from machined wood, extruded aluminum, molded urethane, composite, any combination of materials that provide the requisite structure and decorative function when desired. In one or more embodiments, a perimeter frame is not visible from a front side of the flat panel display cover.

In alternative embodiments, the flat panel display cover 218 engages with the wall 206 instead of the mounting bracket 210 (not shown). In such embodiments, the engagement device engages with a mounting bracket which can be mounted separately from the flat panel display 202. In some embodiments, the size of the flat panel display can be a small fraction of the size of the flat panel display cover. In one non-limiting example, a flat panel display can measure 12 inches by 12 inches and the flat panel display cover can measure 4 feet by 6 feet. Other mismatches in display size and flat panel display cover are possible.

Figure 3:
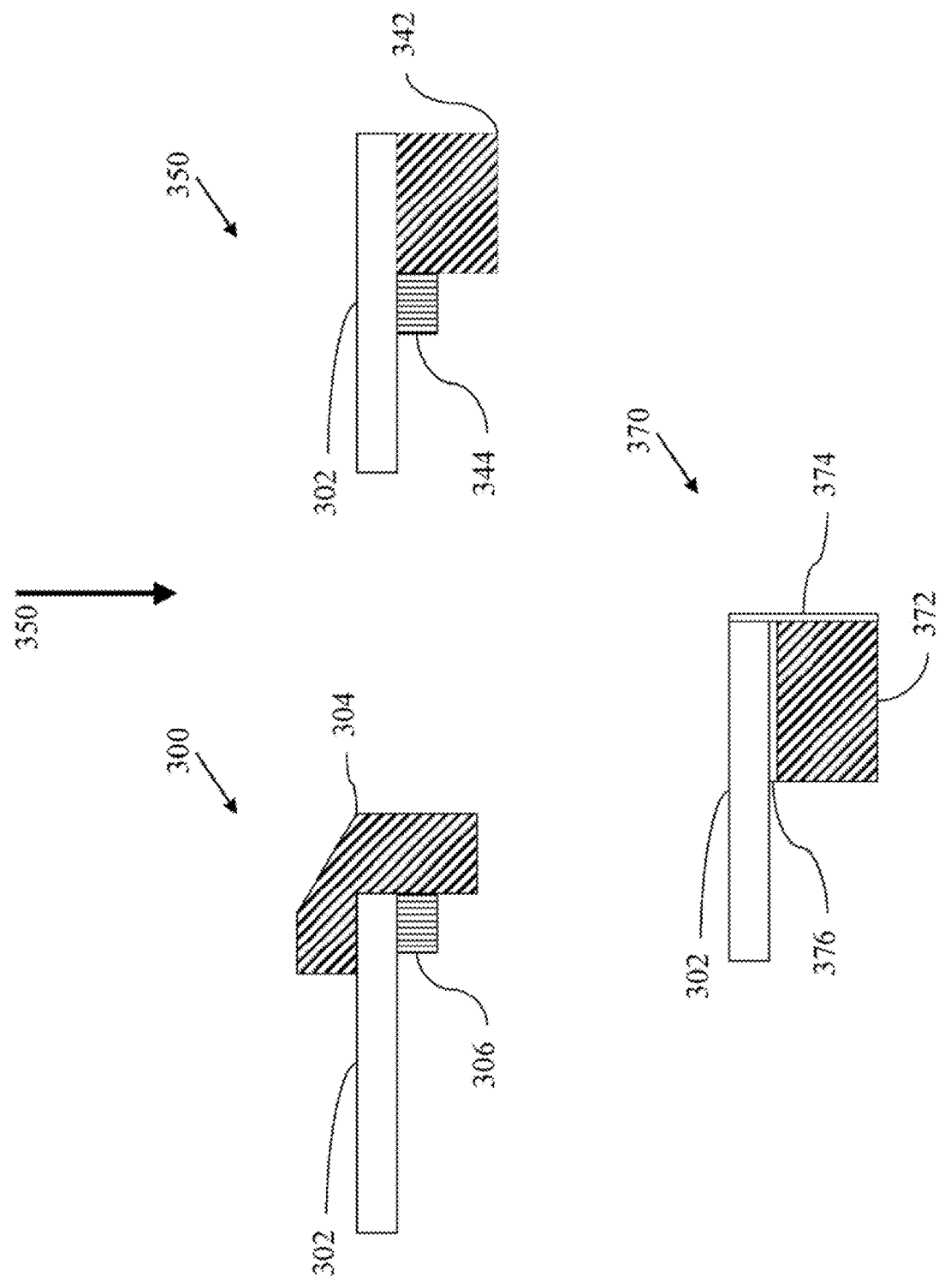
FIG. 3 illustrates different perimeter frame configurations, according to embodiments of the invention.

FIG. 3 illustrates different perimeter frame configurations, according to embodiments of the invention. With reference to FIG. 3, several profile views of surface/perimeter frame assemblies are illustrated. As illustrated in 300, a perimeter frame 304 captures a surface 302 in a channel formed with a retaining strip 306. The perimeter frame 304 is visible when viewed from a front side as indicated by arrow 350. An optional retaining strip 306 can be used together with the perimeter frame 304 to capture an optional blackout shroud (not shown).

Alternatively, in 350 a perimeter frame 342 is coupled to a surface 302. An optional retaining strip 344 can be used together with the perimeter frame 342 to capture a blackout shroud (not shown). The perimeter frame 342 is adhered to the surface 302 with tape, glue or other coupling method. When viewed from a front side as indicated by 350 an observer will not see the perimeter frame 342, thus the flat panel display cover will appear as a mirror without a frame when the flat panel is in an off state.

Alternatively, in other embodiments, such as illustrated at 370, show a surface 302 coupled to a perimeter frame 372 with an adhesive 376 such as tape or glue or other coupling method. A blackout shroud (not shown) can be captured between the surface 302 and the perimeter frame 372. Alternatively, a blackout shroud (not shown) can be attached to 372. In some embodiments, an edge trim 374 is used to provide a finished edge to the flat panel display cover. In yet other embodiments, a perimeter frame is made of members which lock together, such members can be made from a metal such as aluminum, or wood, or from composite materials. In these various embodiments, the perimeter frame can either be visible from a front side of the mirror TV cover or the perimeter frame can be hidden behind the mirror TV cover, or partially visible from a front side of the mirror TV cover.

Figure 4:
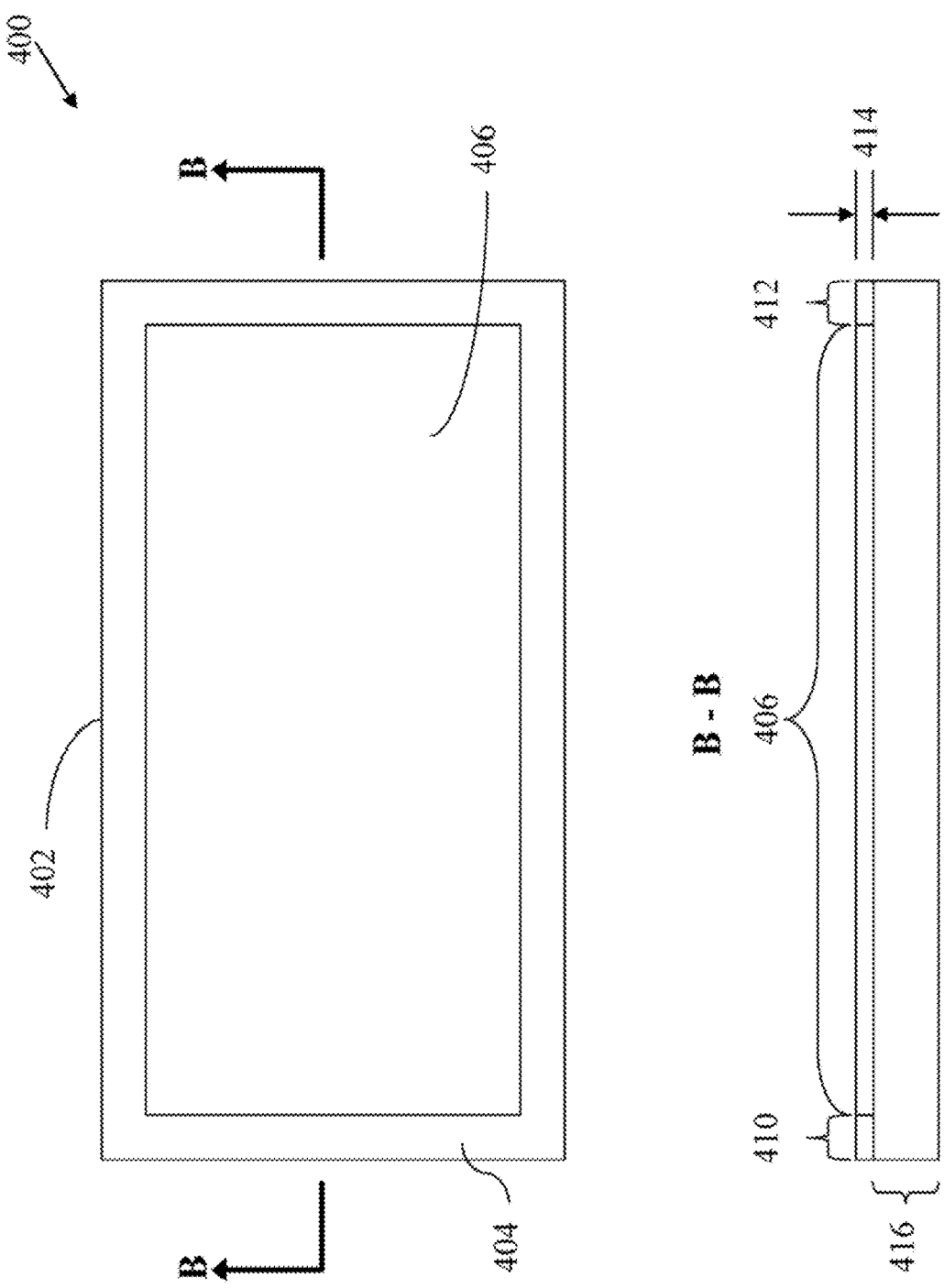
FIG. 4 illustrates preparing a perimeter of a surface, according to embodiments of the invention.

In some embodiments, FIG. 4 illustrates, at 400, preparing a perimeter of a surface, according to some embodiments of the invention. With reference to FIG. 4, a surface 402, which is in some embodiments a sheet of mirror glass, as described above, and in other embodiments is a sheet of plastic, has a perimeter area 404 and a central area 406 that is reflective and transmissive as described above. Cross-sectional view B-B illustrates a thickness 416 of the surface 402. A width of the reflective/transmissive region is indicated at 406. A width of the perimeter region is indicated at 410 and 412. An adhesive having a thickness 414 is shown applied to the regions 410 and 412. Preparation with adhesive as shown in FIG. 4 is performed in some embodiments before coupling to a perimeter frame such as is shown at 342 or 372 (FIG. 3). Note that since the surface is typically reflective and transmissive applying the perimeter frame directly behind the surface provides a mirror in the region indicated at 404. Depending on the reflectivity of the surface 402 it might be necessary to ensure that the adhesive 410/412 is made of a color that enhances mirror performance in the same way that that the region 406 performs as a mirror. To that end, treatment with an adhesive which is a color selected to enable region 404 to provide similar reflectivity as region 406 when the flat panel display is in an off state.

Figure 5:
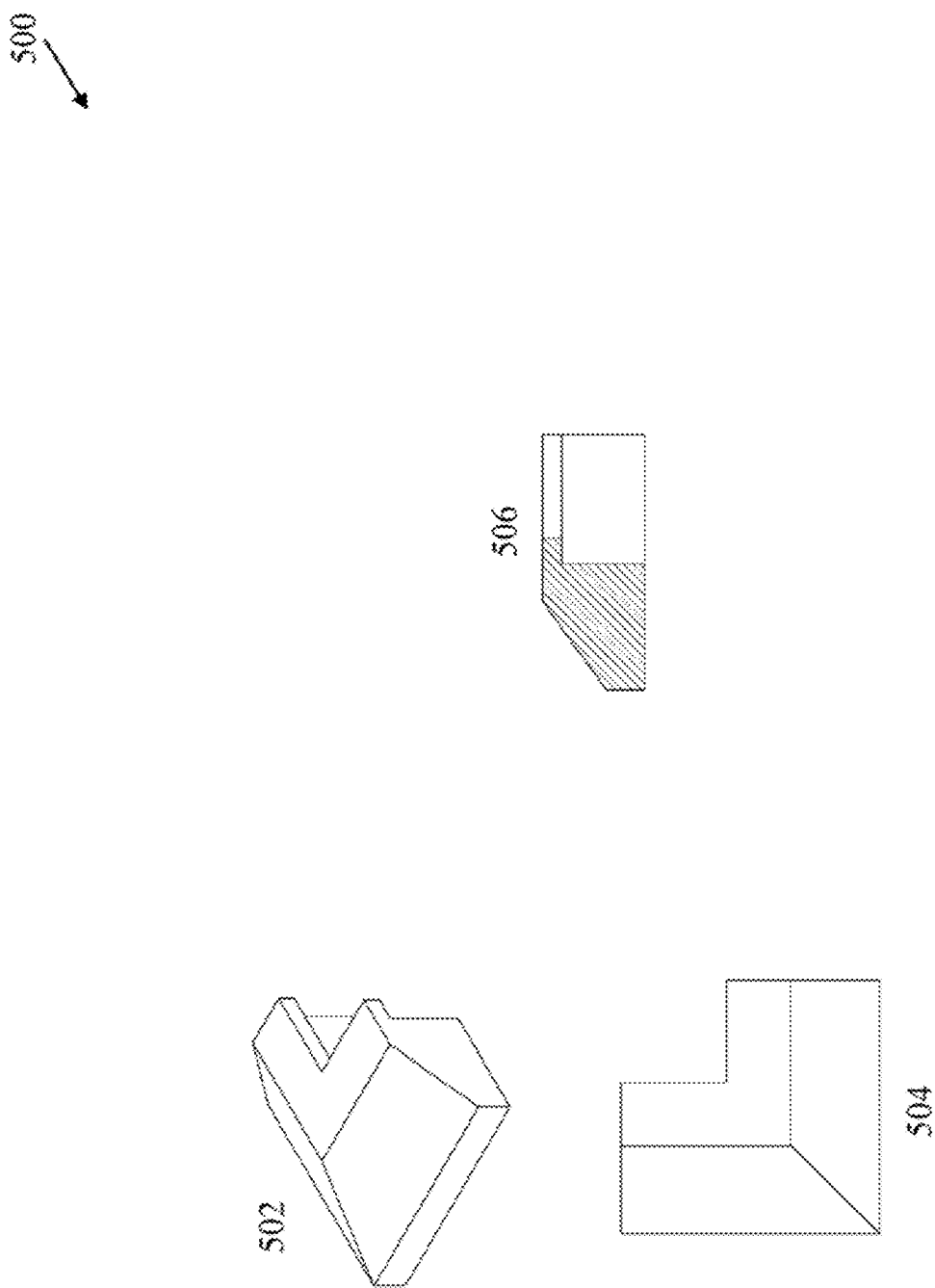
FIG. 5 illustrates, generally at 500, a frame style referred to as Urban Profile™ by ELECTRIC MIRROR, LLC, according to embodiments of the invention.

FIG. 5 illustrates, generally at 500, a frame style referred to as Urban Profile™ by ELECTRIC MIRROR, LLC, according to embodiments of the invention. With reference to FIG. 5, a corner section in isometric view is illustrated at 502. A front view of the Urban Profile™ frame style is illustrated at 504. A cross-sectional profile view of the Urban Profile™ frame style is illustrated at 506. The frame style illustrated in FIG. 5 is a decorative frame which is visible to an observer. Many different frame styles can be used; the Urban Profile™ frame style is used herein for illustration only and does not limit embodiments of the invention to other frame styles. The Urban Profile™ frame style is one example of a decorative frame. As described above, a decorative frame can be combined with a reinforcing frame or a decorative frame can also function as a reinforcing frame by itself. An example of a reinforcing frame used in combination with a decorative frame is illustrated in FIG. 6 below.

Figure 6:
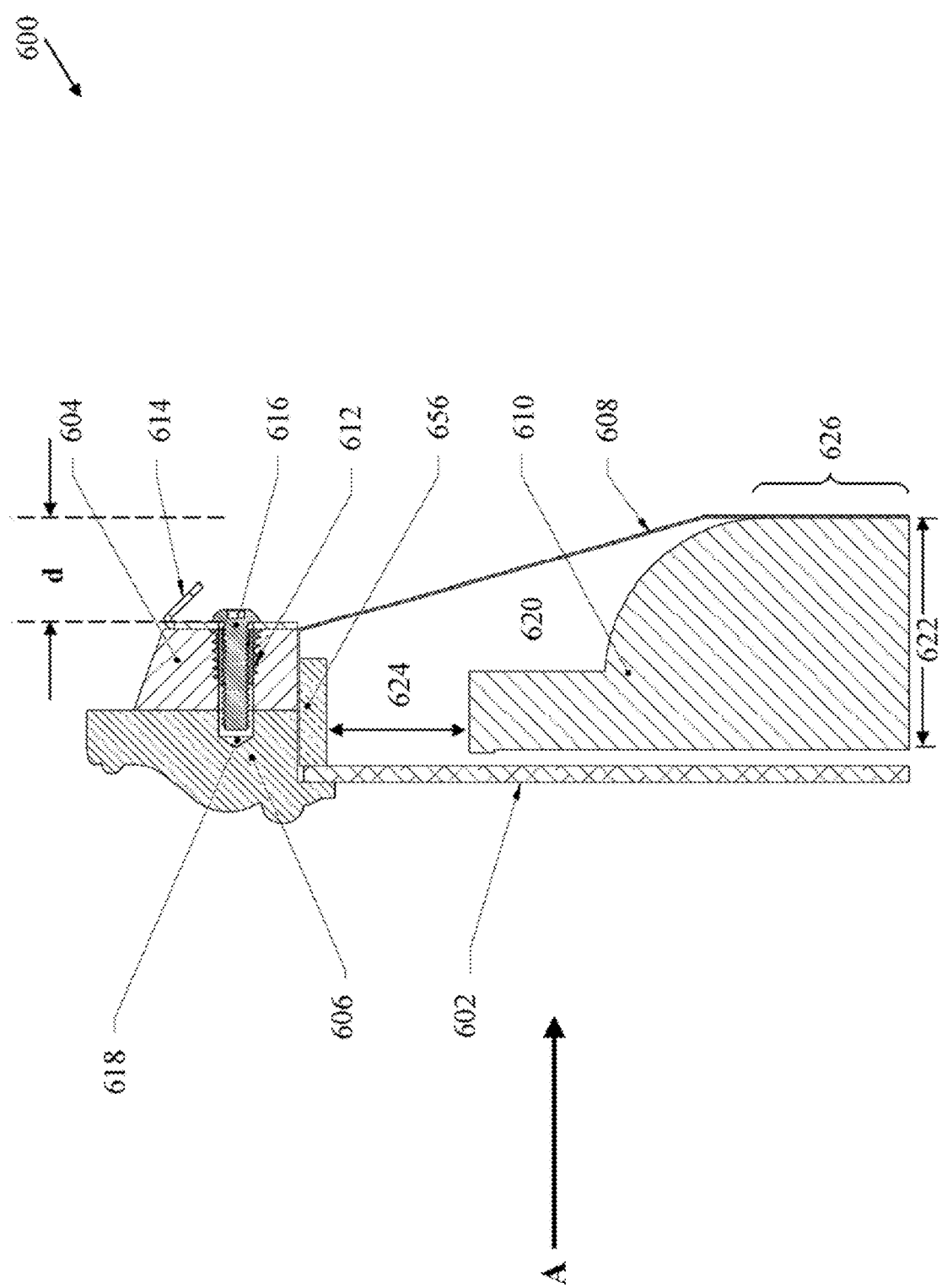
FIG. 6 illustrates a universal flat panel display cover, according to embodiments of the invention.

FIG. 6 illustrates, generally at 600, a universal flat panel display cover, according to embodiments of the invention. With reference to FIG. 6, a corner cross-section of a flat panel display cover with flat panel installed therein is shown in detail view. A surface 602 is coupled to a perimeter frame 606. In FIG. 6, the perimeter frame 606 is visible to an observer from a front side as illustrated at A. In the example of FIG. 6, an optional reinforcing fame 604 is mechanically coupled to the perimeter frame 606. The reinforcing frame 604 can be attached to the perimeter frame 606 with mechanical fasteners such as screws, nails, staples, adhesive strips, glue, etc. In this embodiment, the perimeter frame functions as an outer decorative frame as well as imparting strength to the cover assembly.

A blackout shroud 608 is secured to the perimeter of the flat panel display cover to form a pocket 620 within which the flat panel display 610 is installed. In one embodiment, the blackout shroud is secured to the perimeter of the flat panel display cover by securing the blackout shroud 608 between the perimeter frame 606/reinforcing frame 604 and a reinforcing strip 656. The reinforcing strip 656 is secured to the perimeter frame 606/reinforcing frame 604 with appropriate mechanical fastening such as but not limited to staples, nails, screws, adhesive strip, glue, etc. In some embodiments, an edge of the blackout shroud terminates in a cylindrical bead around the perimeter of the blackout shroud 608 and a cylindrical mating cavity with slot is provided in either the perimeter frame 606 or the reinforcing frame 604 to receive the cylindrical bead thereby providing a termination around the perimeter of the blackout shroud. Alternatively, the blackout shroud 608 can be secured to a back of the perimeter frame with clamping strips, tape, hook and loop closure tape, or a combination of materials to facilitate easy replacement by a user. Also, as described above, in various embodiments, the blackout shroud 608 is made alternatively from tape, material such as cloth, or hook and loop closure material commonly sold under the brand Velcro™, etc.

Once the flat panel display 610 is installed in the pocket 620, the blackout shroud 608 is in contact with a back side of the flat panel display 610 along a contact area 626. The blackout shroud 608 makes contact with the back side of the flat panel display 610 by virtue of one or more of the parameters described above to facilitate such contact, for example, making the blackout shroud 608 out of elastic material, providing an elastic cord in a closure sleeve around an opening in the blackout shroud 608, providing material sufficient to fold the blackout shroud in place and then secure with hook and loop closure, etc. Alternatively, a strip of two-way tape can be used around the perimeter of the back side of the flat panel display 610 to minimize any space between the blackout shroud 608 and the flat panel display 610.

In various embodiments, the flat panel display cover described herein is used with a variety of preexisting flat panel displays all of which can have different thickness and overall dimensions of height and width. The flat panel display cover can be referred to as a universal flat panel display cover or a universal TV cover since flat panel displays are often used as a television. The descriptor "universal" implies the ability to use the flat panel display cover with a variety of different sized preexisting flat panel displays. The words television, TV, or flat panel display do not limit embodiments of the invention. Such terms are used to describe and refer to a flat panel display with which embodiments of the invention can be practiced.

FIG. 6 illustrates an engagement device 614 which is coupled to the reinforcing frame 604. A mechanical coupler 616, in this illustration a screw, is used to couple the engagement device 614 to the reinforcing frame 604. In one embodiment, the engagement device 614 is fashioned as a V clip or alternatively referred to as a "frame clip," the profile of which is illustrated in FIG. 6. The engagement device 614 has a width, thus extending into the plane of the figure. A width of an engagement device is illustrated below in FIG. 10 at 1014. Note that in other embodiments, the engagement device 614 is implemented with different arrangements of parts. Such as, for example, engagement device 614 need not present a V shape but can be made with a ninety degree angle thereby presenting a horizontal surface with a series of holes therein. Corresponding cylindrical protrusion on the mating mounting bracket can releasably engage with one or more of the holes thereby securing the engagement device to the mounting bracket (not shown).

As described above, embodiments of the invention can be used with flat panel displays which have different thickness.

In this instance, FIG. 6 illustrates a flat panel display which has a thickness indicated at 622. Note that a clearance hole 618 is provided in the decorative frame 606 for the mechanical coupler 616 (in this embodiment a screw). The clearance hole 618 permits the mechanical coupler 616 to be used with a range flat panel displays which have a thickness greater than 622. As the thickness of a flat panel display increases, spacers are added as needed between the reinforcing frame 604 and the engagement device 614 in order to keep dimension "d" within a specified tolerance. Dimension "d" is the distance between the back of the flat panel display and a reference point on the engagement device. Maintaining uniformity of dimension "d" across a range of flat panel displays permits the flat panel display cover to be used with a range of flat panel displays each having a different thicknesses.

As described above, different material can be used for the reinforcing frame 604 or the perimeter frame 606. Likewise, different materials can be used for the surface 602. Thus, the weight of the flat panel display cover can become appreciable depending on the choice of materials used. Depending on the material used for the reinforcing frame 604 or the perimeter frame 606, especially when wood or plastic is used, a threaded insert 612 is used in one or both of these frame members to provide a thread capable of sustaining sufficient stress to ensure safe assembly. In other embodiments, various other methods and parts are used to provide sufficient strength in the frame members to accomplish assembly, such as local reinforcement through threaded plates which can be bonded in place, etc.

Note that in FIG. 6, there is a clearance indicated at 624 between an upper edge of the flat panel display 610 and the retaining strip 606. In various embodiments, clearance such as indicated at 624 is provided between the flat panel display along each of the four sides of a display, i.e., bottom, top, left side, and right side with respect to each retaining strip of frame member. This clearance permits a range of flat panel display sizes to be used with a single flat panel display cover. For example, the width and height of a nominally 55 inch flat panel display will vary according to different manufactures' products and age of the display. Legacy displays typically have a larger boarder around the display screen than do current displays which tend to minimize the non-viewable border region around a flat panel display. Providing clearance and the ability to adjust vertically the flat panel display cover relative to the flat panel display by using a plurality of slots positioned at an angle in the mounting bracket as well as engagement devices which permit horizontal adjustment facilitate both centering an image and accommodating a range of display sizes through the use of a universal flat panel display cover.

Figure 7:
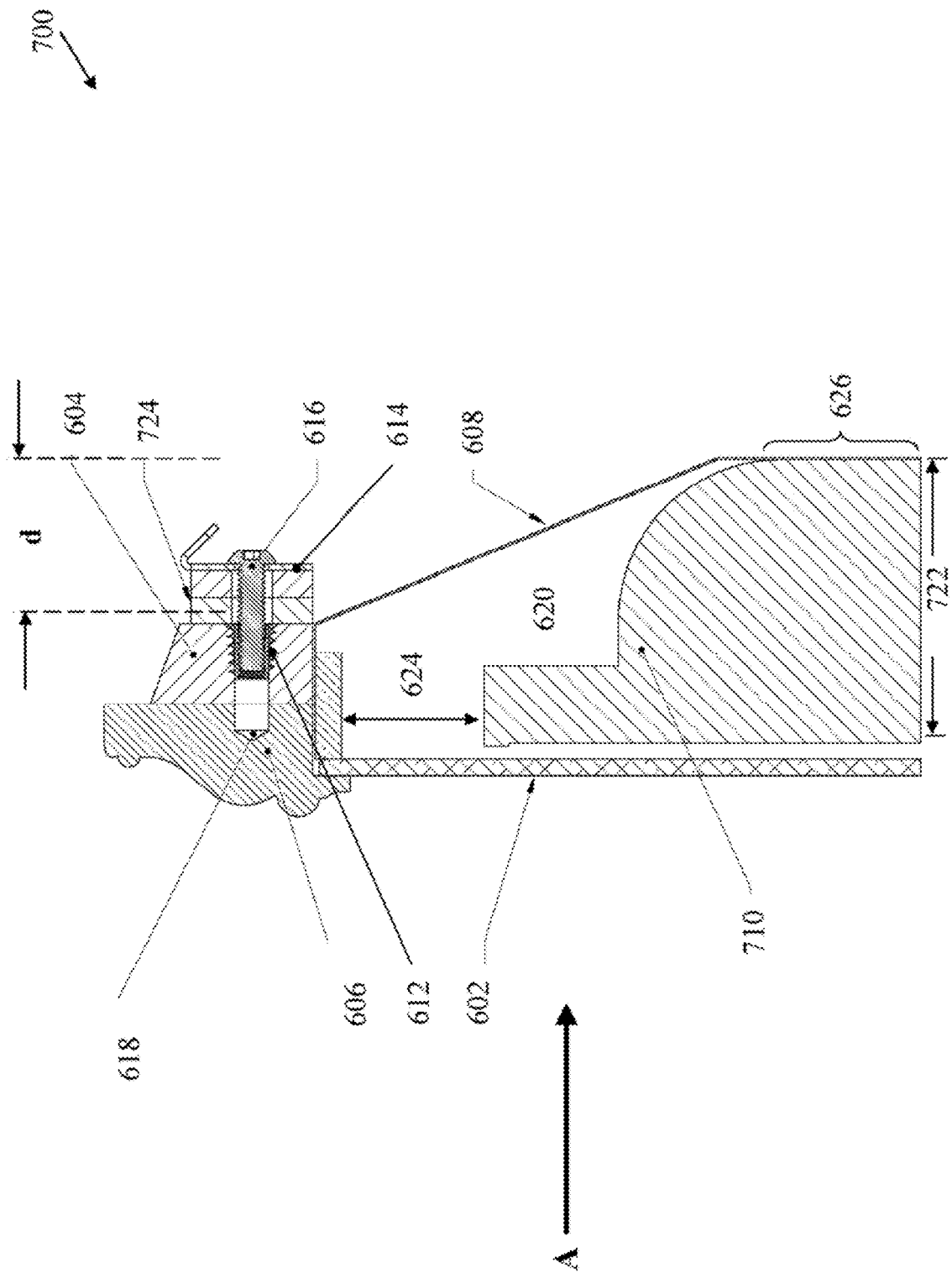
FIG. 7 illustrates the universal flat panel display cover of FIG. 6 used with a different flat panel display, according to embodiments of the invention.

FIG. 7 illustrates, generally at 700, the universal flat panel display cover of FIG. 6 used with a different flat panel display, according to embodiments of the invention. With reference to FIG. 7, the flat panel display cover illustrated in FIG. 6 including surface 602, perimeter frame 606, reinforcing frame 604, blackout shroud 608, mechanical coupler 616, engagement device 614, clearance hole 618, and threaded insert 612 is used with a flat panel display 710 which has a different thickness 722 than the thickness 622 of flat panel display 610 in FIG. 6. The thickness 722 of flat panel display 710 is greater than the thickness 622 of flat panel display 610 (FIG. 6). In order to maintain design parameter "d," across a range of display thicknesses, within its tolerance, spacers 724 are added in between the reinforcing frame 604 and the engagement device 614. Adding spacers 724 compensates for the increase in thickness between 622 (FIG. 6) and 722 (FIG. 7). Spacers 724 are also used to cause a separation between an inner side of the surface 602 and a bezel around the screen of the flat panel display 710. Such separation serves to lessen the reflection of light from the bezel which helps to keep the flat panel display from becoming visible when the flat panel display is in an off state and the flat panel display cover is functioning as a mirror. Note that the same mechanical coupler 616 is also used to secure the engagement device 614 to the reinforcing frame 604 with spacers 724 installed. The clearance hole 618 accommodates the increased screw length when thinner flat panel displays are used such as 610 (FIG. 6).

In embodiments of the invention, directed to a universal mounting kit for the flat panel display cover, a plurality of spacers and a plurality of screws are provided with a given flat panel display cover to accommodate the range of thicknesses of flat panel displays that exist in the market place. Flat panel displays have evolved over time and have become thinner as time has passed. Thus, older displays are thicker and newer displays are thinner. By way of non-limiting example, in one or more embodiments, a set of spacers permits a universal mounting kit to span a range of flat panel displays ranging in thickness from approximately 15 millimeters to 200 millimeters or more. Embodiments of the invention are not limited by the thickness of a flat panel display and the aforementioned range is provided merely as an example.

Design parameter "d" is an arbitrary value which depends on where reference points are taken for measurement. However, the value for "d" typically falls within a range set by a distance from a backside of a flat panel display (display of minimum thickness) to the surface when the flat panel display is installed in the flat panel display cover. A tolerance for "d" is established by a length of mechanical coupler 616 and a minimum contact distance which is required for the coupler. Which in the case of a screw mechanical coupler 616 means a minimum number of threads required for safe engagement.

Figure 8:
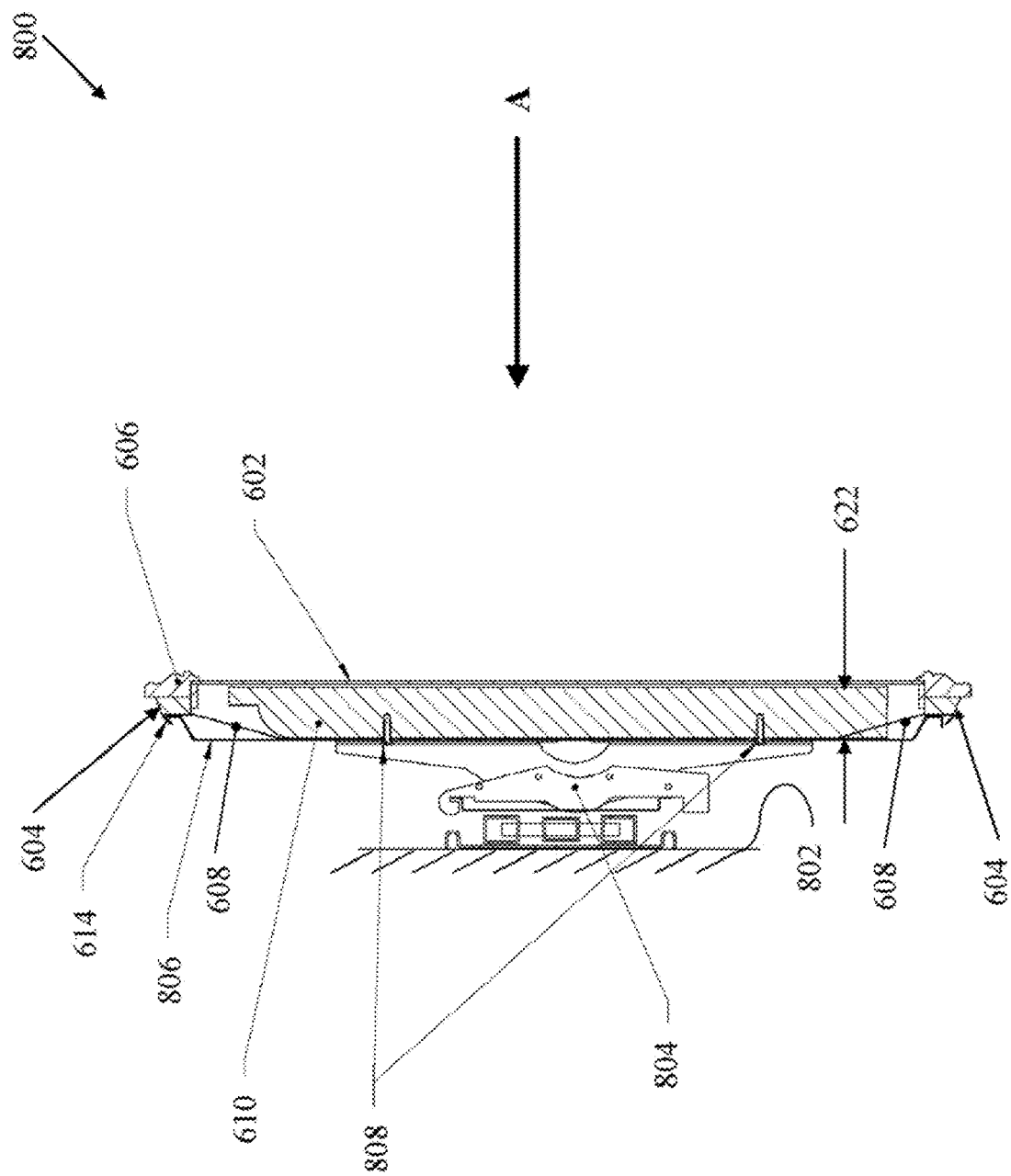
FIG. 8 illustrates a full profile view of the assembly from FIG. 6, according to embodiments of the invention.

FIG. 8 illustrates, generally at 800, a full profile view of the assembly from FIG. 6, according to embodiments of the invention. With reference to FIG. 8, the flat panel display cover including; surface 602, perimeter frame 606, reinforcing frame 604, blackout shroud 608, mechanical coupler 616, engagement device 614 are used with a flat panel display 610. The flat panel display 610 is attached with screws 808 to a wall mount 804 using the Video Electronics Standard Association (VESA) flat panel display mounting interface. The wall mount 804 is any one of a number of commercially available wall mounts which are designed for use with flat panel displays to provide support to a wall 802. As described above, the VESA holes are used to place slots into mounting brackets 806 (two are typically used) in order to install the flat panel display cover on the flat panel display.

Referring momentarily to FIG. 10, a plurality of slots 1022 are shown in a right mounting bracket and a plurality of slots 1024 are shown in a left mounting bracket in FIG. 10 below. Using the plurality of slots permits the mounting bracket and mating flat panel display cover to be moved vertically relative to the flat panel display so that an image on the flat panel display which is viewed on the surface of the flat panel display cover can be centered (vertically) with respect to the surface of the flat panel display cover. Thereby, a flat panel display cover can be used with a range of flat panel displays which have different vertical dimensions. This vertical adjustment range is another aspect of the universal flat panel display cover.

Referring back to FIG. 8, a width 622 of the flat panel display 610 is indicated in the figure. When an observer views a front side of the surface 602 from a position shown as A, the combination of the flat panel display cover installed on the flat panel display 610 provides the two modes of operation previously discussed in conjunction with FIG. 1. A first mode of operation TV mode, where in an on state, images displayed on the flat panel display 102 are visible as indicated at 112 (FIG. 1). The second mode of operation is MIRROR mode, where in an off state, images from the flat panel display are not displayed but instead the assembly presents the appearance of a mirror 114 (FIG. 1) to the observer viewing from a front side at A (FIG. 2).

Figure 9:
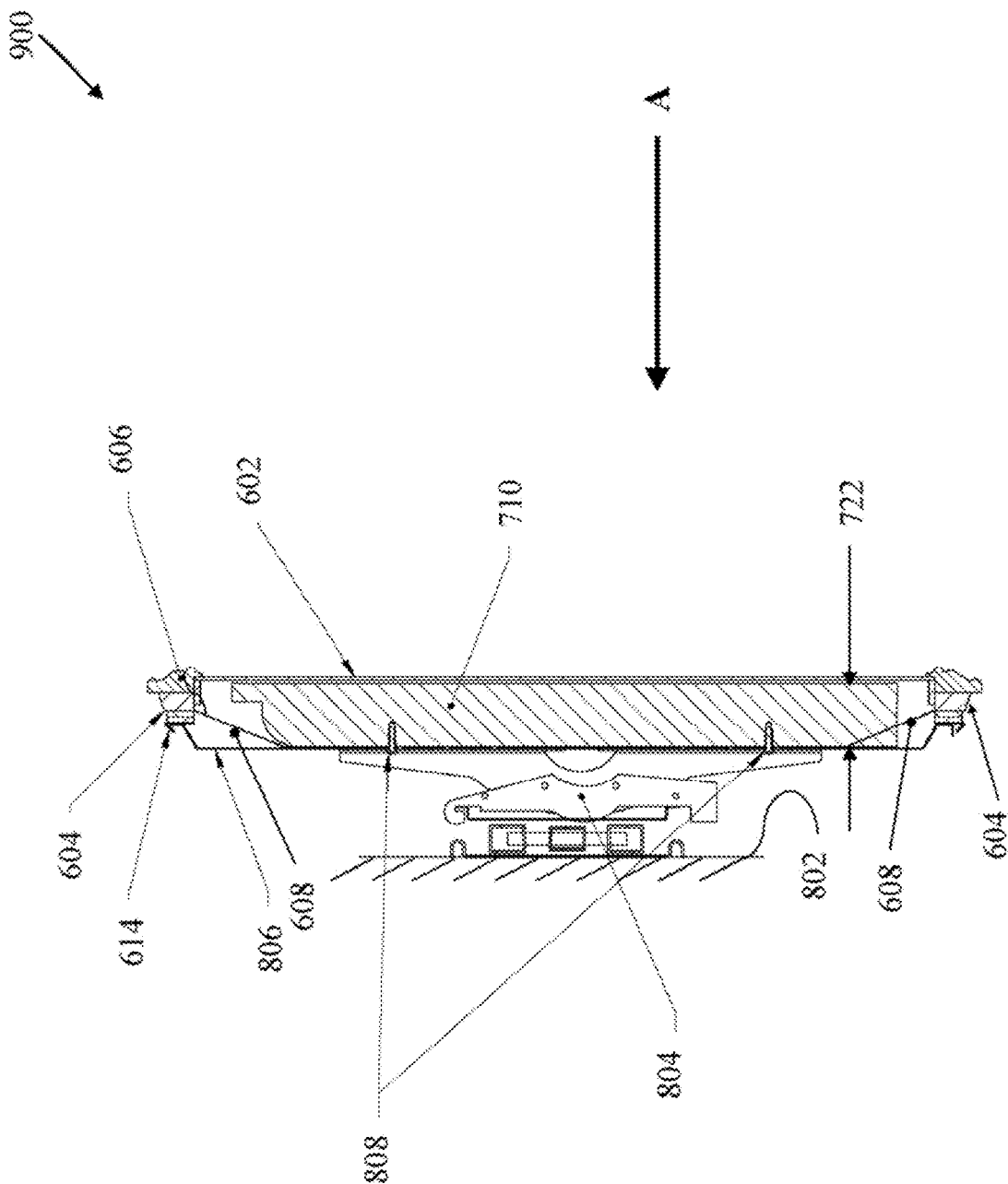
FIG. 9 illustrates a full profile view of the assembly from FIG. 7, according to embodiments of the invention.

FIG. 9 illustrates, generally at 900, a full profile view of the assembly from FIG. 7, according to embodiments of the invention. With reference to FIG. 9, the flat panel display cover including; surface 602, perimeter frame 606, reinforcing frame 604, blackout shroud 608, engagement device 614, are used with the thicker flat panel display 710 and spacers 724. Use of spacers 724 maintains the parameter "d" within the range of tolerances described above when a flat panel display 710 is used which has thickness 722.

Mounting brackets 806 are illustrated in FIG. 8 and FIG. 9. As described above, the mounting brackets 806 are installed in between the wall mount 804 and the flat panel display 610 or 710. To install the mounting brackets 806, the screws 808 are loosened to create a gap between the display and the wall mount 804. Next, each mounting bracket 806 is slipped into the gap and the screws 808 are retightened. In this manner, the flat panel display cover can be installed without removing the flat panel display from the wall mount 804.

FIG. 10 illustrates, generally at 1000, an exploded view of a universal flat panel display cover with flat panel display, according to embodiments of the invention. With reference to FIG. 10, in various embodiments, a surface 1002 is captured between a perimeter frame 1004 and retaining strip 1006. In some embodiments, a reinforcing frame 1008 in used with the perimeter frame 1004 as described above in conjunction with the previous figures. A blackout shroud 1010 is secured to the perimeter frame 1004 and is captured in various ways using one or more of the perimeter frame 1004, retaining strip 1006, and the reinforcing frame 1008. The combination of the surface 1004, the blackout shroud 1010, and the perimeter frame 1004 forms a pocket into which the flat panel display 1012 is installed.

An engagement device 1014 is secured with mechanical couplers 1016 to the reinforcing frame 1008. Note that in some embodiments, the engagement device 1014 is secured directly to the perimeter frame 1004. Depending on the thickness of the flat panel display 1012, spacers 1026 are used as described above to accommodate different thickness flat panel displays.

Mounting brackets 1018 are slipped into gaps between the flat panel display 1012 and a wall mount 1020. A plurality of angled slots 1022 and 1024 on each mounting bracket 1018 permit adjustment of the flat panel display cover relative to the flat panel display 1012 in the vertical direction.

Figure 11:
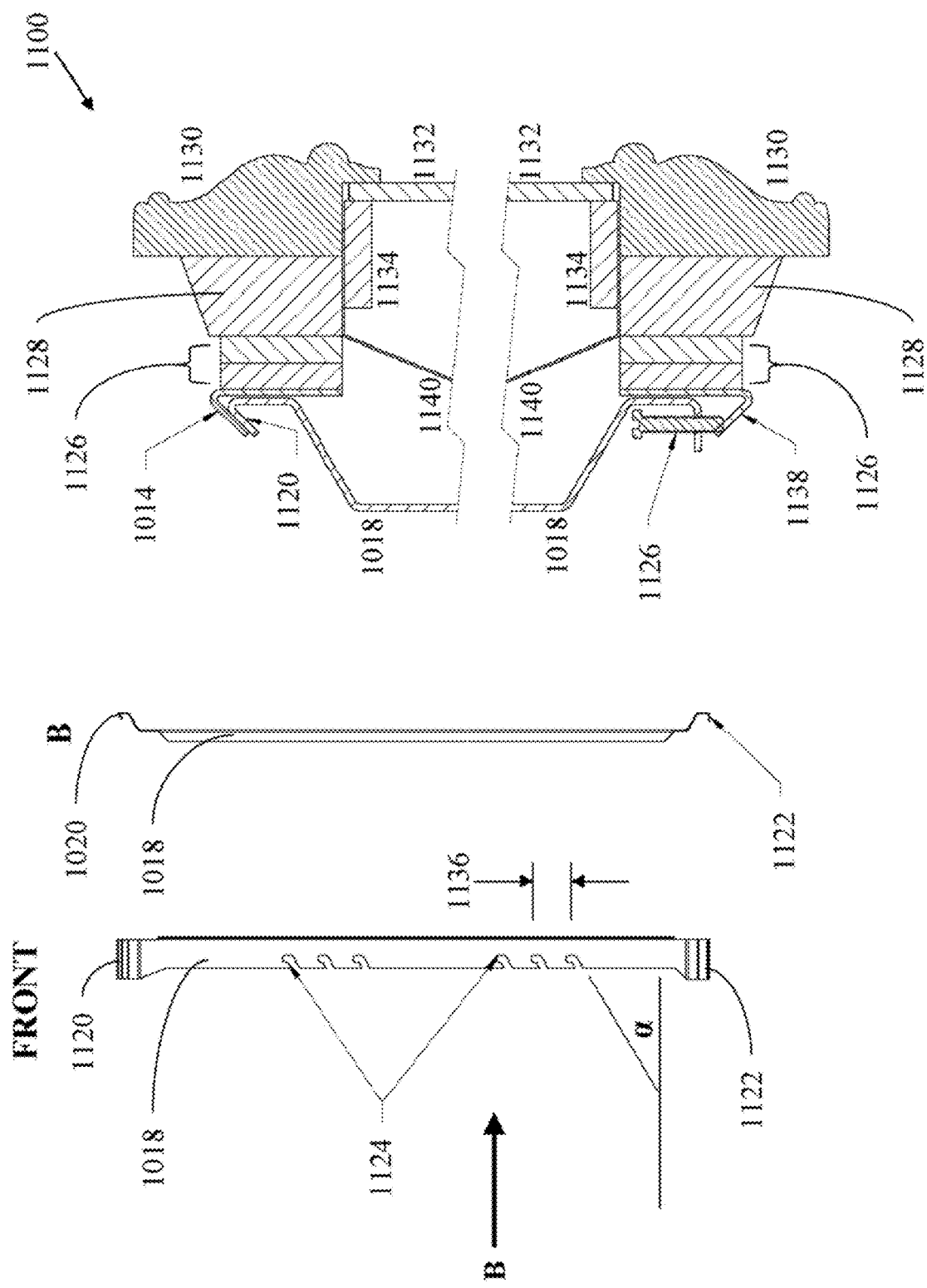
FIG. 11 illustrates an engagement device/mounting bracket assembly, according to embodiments of the invention.

FIG. 11 illustrates, generally at 1100, an engagement device/mounting bracket assembly, according to embodiments of the invention. With reference to FIG. 11, a front view of the mounting bracket 1018 is shown with an upper end 1120, a lower end 1122, and a plurality of slots 1124 for VESA screws. Note that in one embodiment, the slots 1124 form an angle α with a horizontal reference. A side view of the mounting bracket 1018 is indicated at view B. Close-up detailed views of each end of the flat panel display cover are indicated in FIG. 11.

In various embodiments, a flat panel display cover has a surface 1132 mounted within a perimeter frame 1130, reinforcing frame 1128, and secured by retaining strip 1134. A blackout shroud 1140 is captured between the perimeter frame 1130/reinforcing frame 1128, and the retaining strip 1134. An engagement device 1014 is secured to the reinforcing frame with spacers 1126 to provide an upper mounting structure to engage with the upper end 1120 of the mounting bracket 1018. Similarly, an engagement device 1138 is attached to the reinforcing frame 1128 with spacers 1126 to provide a lower mounting structure which releasably engages with a lower end 1122 of the mounting bracket 1018.

During installation, the engagement device 1014 is engaged with the top end 1120 of the mounting bracket as a first step. During a further step of installation, the flat panel display cover swings into place as the engagement device 1138 comes into contact with the lower end 1122 of the mounting bracket. A coupling mechanism is used to secure 1138 with 1122. In one or more embodiments, a coupling mechanism is a thumb screw 1126.

Figure 12:
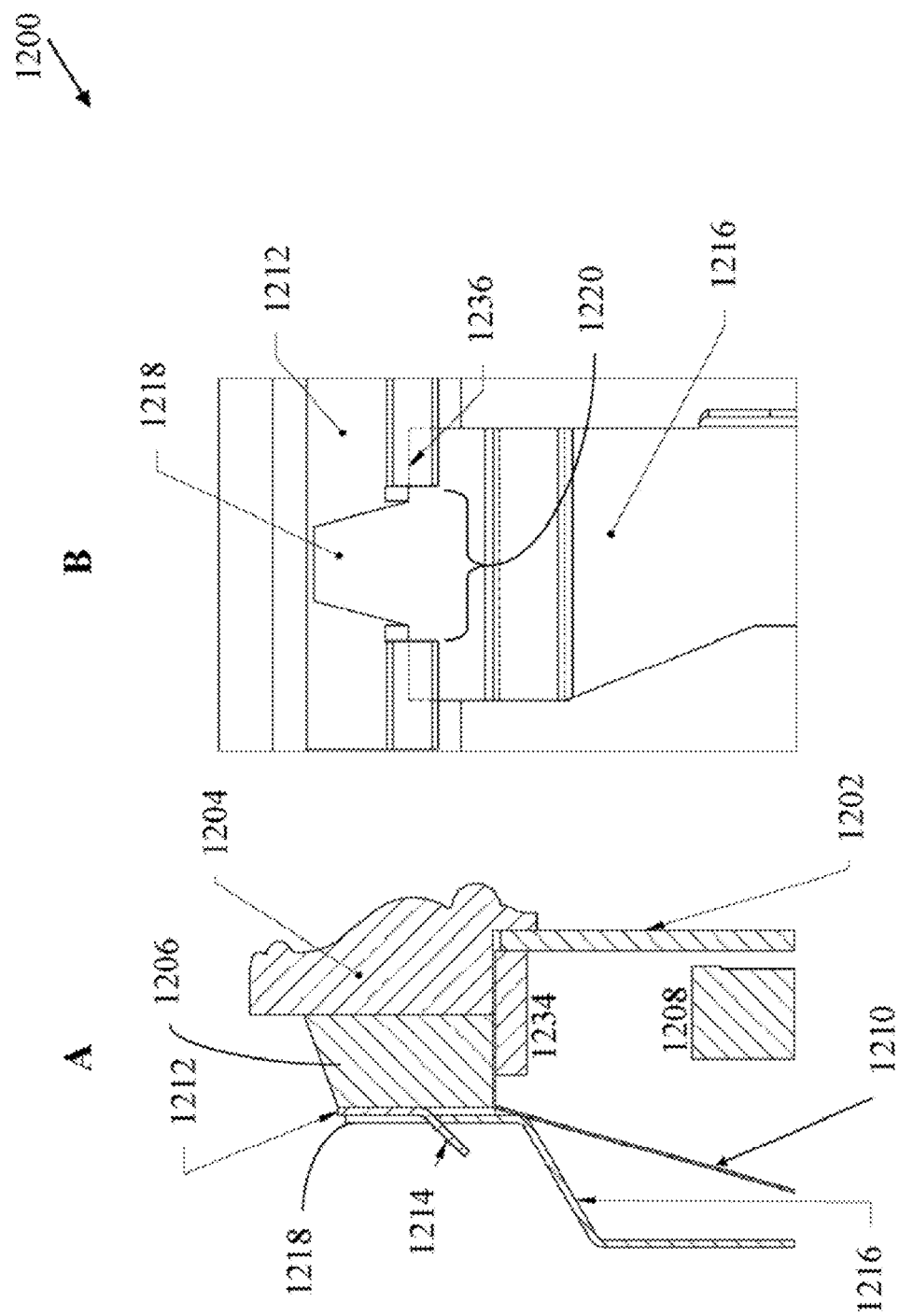
FIG. 12 illustrates another engagement device/mounting bracket assembly, according to embodiments of the invention.

FIG. 12 illustrates, generally at 1200, another engagement device/mounting bracket assembly, according to embodiments of the invention. With reference to FIG. 12, a side profile view is shown in A and backside plan view is illustrated in B for a detail view of an engagement device/mounting bracket assembly. Referring to profile view A, the basic flat panel display cover is illustrated with a surface 1202 mounted in a structure which includes a perimeter frame 1204 (in some embodiments a reinforcing frame 1206 and a retaining strip 1234. In one embodiment, an upper end of a flat panel display is illustrated at 1208 and a blackout shroud 1210 is terminated around its perimeter against the perimeter frame 1204 together with the retaining strip 1234. As described above the blackout shroud forms an opening. The edge of the opening rests against the flat panel display as described above in conjunction with the preceding figures however, that contact is not shown in FIG. 12 in order to concentrate on the detail of the engagement device with the mounting bracket. Note that in some embodiments, a single mounting bracket is provided such that a single point of engagement is accomplished by an engagement device. In various embodiments, a slot 1220 can be made with an increased horizontal extent thereby providing stability for a larger mirror TV cover to be supported by a single center mount mounting bracket.

In various embodiments, an engagement device 1212/1214 is configured with a series of slots. An upper end 1218 of the mounting bracket is inserted into one of the slots. Engagement between the engagement device 1212/1214 and the upper end of the 1218 of the mounting bracket provides a releasably engageable connection that facilitates mounting the flat panel display cover on the mounting bracket 1216. Back plan view B illustrates the engagement device 1212/1214 and one slot 1220 into which the upper end 1218 of the mounting bracket 1216 is placed, resulting in contact between the two structures that is indicated along a line 1236.

Figure 13:
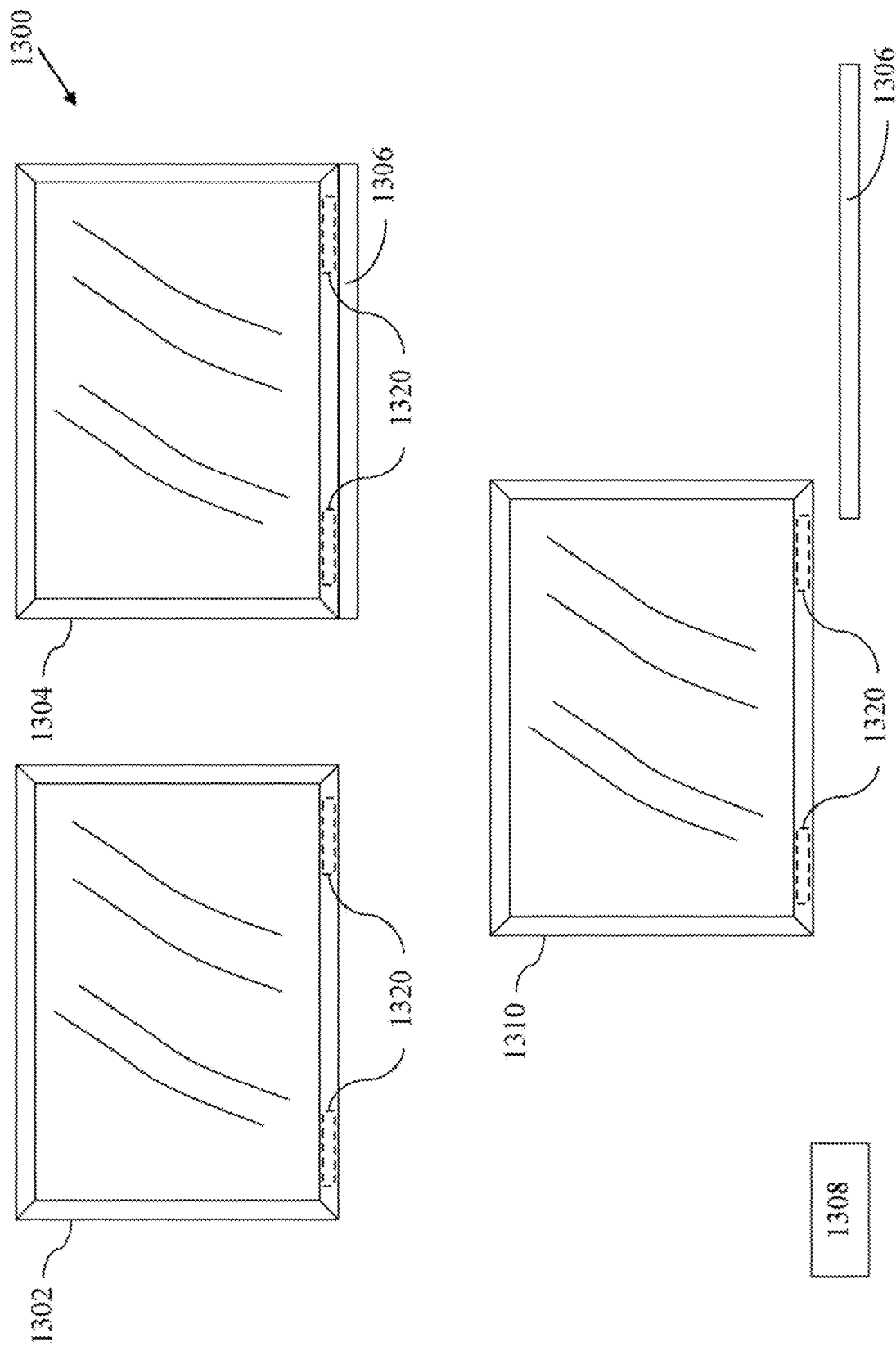
FIG. 13 illustrates an auxiliary sound system used in conjunction with the flat panel display cover, according to embodiments of the invention.

FIG. 13 illustrates, generally at 1300, an auxiliary sound system used in conjunction with the flat panel display cover, according to embodiments of the invention. With reference to FIG. 13, a flat panel display cover 1302 includes a surface, perimeter frame, engagement device, blackout shroud as previously described above. Depending on the material selected for the surface in the reflective cover it can be desirable to enhance the sound emitted from the flat panel display. In one embodiment, speakers 1320 are incorporated into a perimeter frame as indicated at 1320. Incorporating speakers into a perimeter frame can be accomplished by recessing the speakers into the perimeter frame and providing a perforated protective grill over the speaker area. In another embodiment, the speakers are attached to a backside of the perimeter frame.

In another embodiment, a flat panel display cover 1304 includes an auxiliary sound bar 1306 to provide audio previously provided by the flat panel display's internal speakers or in conjunction with the flat panel display's internal speakers. In one embodiment, the sound bar 1306 is coupled to the universal flat panel display cover 1304 such that the composite device is configured as a unitary whole. Optional speakers 1320 can also be provided with the flat panel display 1304 along with the sound bar 1306.

In another embodiment, an audio output from the flat panel display is provided to the sound bar 1306 as an audio input with a wired connection. Alternatively, an audio output signal can be provided wirelessly to the sound bar 1306 thereby eliminating the need for a wire connection between the flat panel display and the sound bar. Wireless connection is accomplished, by way of non-limiting examples, with wireless protocols such as the Bluetooth communication protocol known as IEEE 802.15 or other communication protocols such as is commonly known as Wi-Fi IEEE 802.11. Wireless transmission of audio data is also facilitated using the ZigBee specification using IEEE 802.15.4.

In various embodiments, the sound bar 1306 contains a module designed to implement the Bluetooth communication protocol. In one embodiment, the wireless data module is a BlueGiga® WT-32 Bluetooth streaming audio module. Protocols other than Bluetooth can be implemented in the system for audio streaming, such as for example, IRAD (Infrared Data Association) IRAD-4M protocol which provides a data transfer rate of 3 megabits/sec (MB/s). When the Bluetooth communication protocol is implemented, the sound bar 1306 and or 1308 will have a range of approximately 10 to 30 meters.

In some embodiments, a sound bar 1306 is located separately from the flat panel display cover 1310. A sound bar 1306 can be complimented with a low frequency sound source 1308 such also known as a woofer. Separate sound bar 1306 or 1308 can be provided with an audio input from the flat panel display via either a wired or wireless connection. Optional speakers 1320 can also be provided with the flat panel display 1310 along with the sound bar 1306 and or woofer 1308.

In yet other embodiments the speakers are mounted on a back side of the surface. The speakers can be acoustic devices with moving coils or they can be vibrational transducers that mount to and vibrate the surface causing the surface to function as a speaker.

Figure 14:
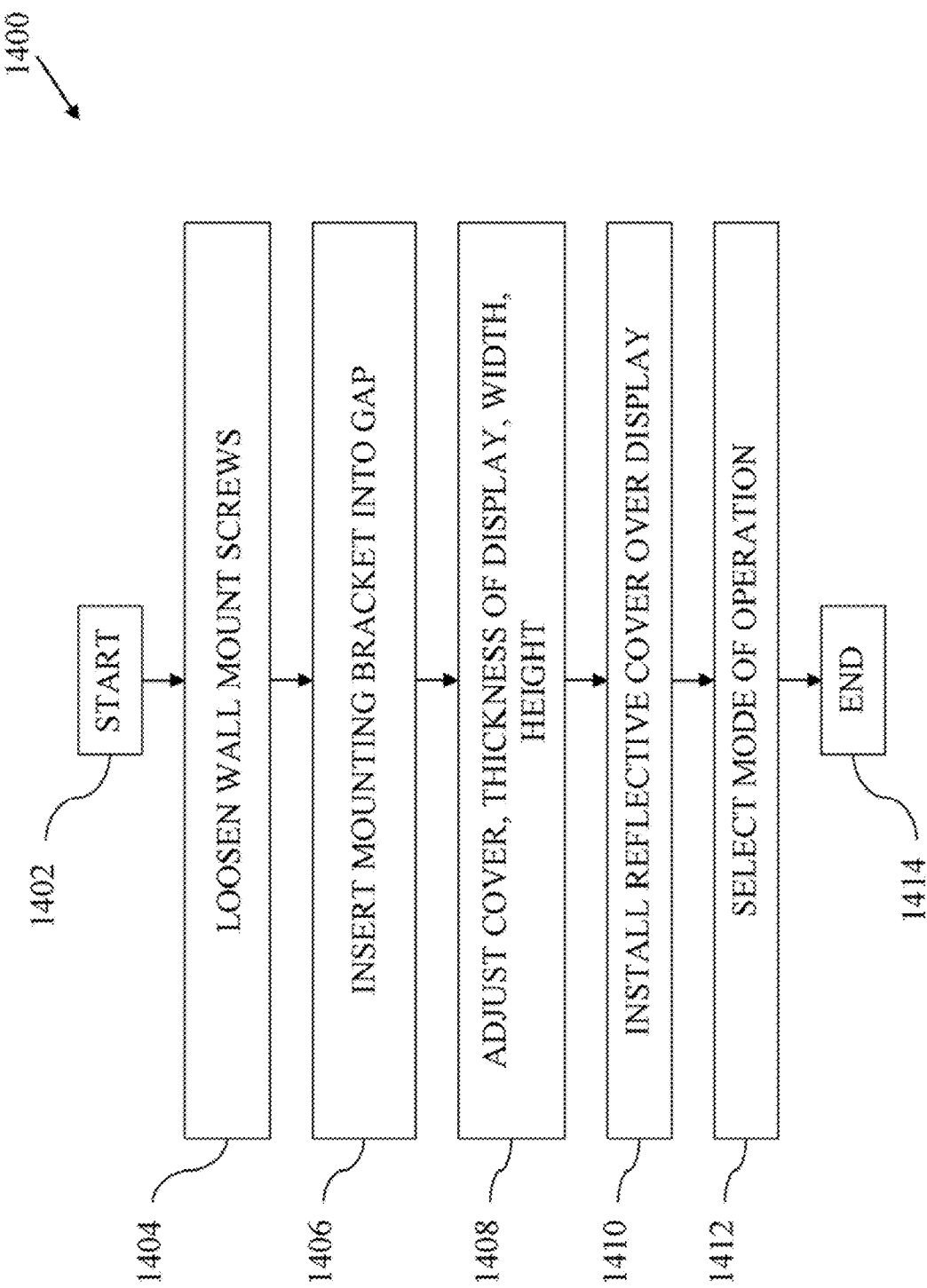
FIG. 14 illustrates a process to create two modes of operation from an existing flat panel display with a universal flat panel display cover

FIG. 14 illustrates, generally at 1400, a process to create two modes of operation from an existing flat panel display with a universal flat panel display cover. With reference to FIG. 14, a process starts at a block 1402. At a block 1404 the screws that connect the flat panel display to a universal wall mount are loosened to create a gap between the wall mount and the flat panel display. At a block 1406 a mounting bracket is inserted into the gap formed at block 1404. At a block 1408 the flat panel display cover is adjusted to accommodate a thickness of the flat panel display, a width of the flat panel display, and a height of the flat panel display. At a block 1410 the reflective cover is installed on the flat panel display. At a block 1412 a mode of operation is selected for the system which is either; (1) TV mode, where the flat panel display displays images on the surface to a viewer and projects accompanying audio through speakers either resident in the flat panel display or through a separate sound bar, or (2) MIRROR mode where the flat panel display cover functions as a mirror when observed from a front side. A process stops at a block 1414.

For purposes of discussing and understanding embodiments of the invention, it is to be understood that various terms are used by those knowledgeable in the art to describe techniques and approaches. Furthermore, in the description, for purposes of explanation, numerous specific details are set forth in order to provide a thorough understanding of the embodiments. It will be evident, however, to one of ordinary skill in the art that the embodiments may be practiced without these specific details. In some instances, well-known structures and devices are shown in block diagram form, rather than in detail, in order to avoid obscuring the embodiments. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein may implement embodiments of the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

Methods according to embodiments of the present invention may be implemented in hard-wired circuitry (e.g., integrated circuit(s)), by programming a general-purpose processor, or by any combination of hardware and software. One of ordinary skill in the art will immediately appreciate that the embodiments can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The embodiments may also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement the teachings of the embodiments as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the embodiments may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A reflective cover for a flat panel display, comprising:
a surface, the surface is both reflective and transmissive;
a perimeter frame, the perimeter frame is configured to couple to the surface around a perimeter of the surface, the perimeter frame further comprising:
an engagement device, the engagement device is attached to the perimeter frame, the engagement device is configured to engage with a mounting bracket; and
a blackout shroud, the blackout shroud is coupled to the perimeter frame to form an opening, the opening is sized so that during installation, the flat panel display is inserted into the opening, such that after installation, the blackout shroud contacts a back side of the flat panel display thereby substantially blocking out ambient light from entering between the blackout shroud and the flat panel display, and the engagement device engages with the mounting bracket, in operation when the flat panel display is in an on state, images displayed thereon are visible through the surface and when the flat panel display is in an off state, a mirror like reflection is provided from the surface.

2. The reflective cover of claim 1, wherein the surface is a glass layer which is substantially reflective when viewed from a front side and the flat panel display is in the off state and is substantially transmissive when the flat panel display is in the on state.

3. The reflective cover of claim 2, wherein the glass layer provides approximately a reflectivity of sixty percent and a transmissivity of forty percent with respect to incident light.

4. The reflective cover of claim 1, wherein the surface is selected from the group consisting of a partially silvered glass, dielectric coated glass, thin film reflective scrim, a user defined substantially reflective material which allows partial light transmission.

5. The reflective cover of claim 1, wherein the surface is selected from the group consisting of an acrylic layer, a partially silvered clear plastic, and a Mylar film.

6. The reflective cover of claim 1, wherein the perimeter frame is visible from a front side.

7. The reflective cover of claim 6, wherein the perimeter frame is configured to resemble a picture frame.

8. The reflective cover of claim 1, further comprising:
a decorative frame, the decorative frame is coupled to the perimeter frame to present an appearance of a framed mirror when the flat panel display is in the off state.

9. The reflective cover of claim 8, wherein clearance holes are provided in the decorative frame to increase a range of thickness for flat panel displays which can be secured with a fastener used with the engagement device.

10. The reflective cover of claim 1, wherein the perimeter frame is hidden behind the surface when the surface is viewed from a front side.

11. The reflective cover of claim 1, wherein the engagement device has an upper end and provides lateral adjustment such that the flat panel display can be moved left or right relative to the perimeter frame.

12. The reflective cover of claim 1, wherein the mounting bracket is configured to interface with Video Electronics Standard Association (VESA) holes wherein vertical adjustment of the reflective cover relative to the flat panel display is provided by a plurality of VESA holes in the mounting bracket.

13. The reflective cover of claim 12, wherein each VESA hole is part of a slot which permits installation of the mounting bracket without removing the flat panel display from a wall mount device.

14. The reflective cover of claim 1, wherein the engagement device includes a lower end which is configured to releasably engage with the mounting bracket.

15. The reflective cover of claim 1, wherein the blackout shroud is made of a material that blocks light selected from the group consisting of cloth, coated fabric, neoprene rubber, and sheet metal.

16. The reflective cover of claim 15, wherein the material is elastic.

17. The reflective cover of claim 1, wherein the blackout shroud is made from a light block flexible material and the flexible material is folded around the flat panel display after the flat panel display in inserted into the opening.

18. The reflective cover of claim 1, wherein a perimeter of the opening is gathered together with a pull string.

19. The reflective cover of claim 18, further comprising: hook and loop closure strip that releasably secures the blackout shroud to the flat panel display.

20. The reflective cover of claim 1, further comprising: a spacer, the spacer is placed between the perimeter frame and the engagement device, and a thickness of the spacer is selected based on a thickness of the flat panel display.

21. The reflective cover of claim 20, wherein the spacer is a member of a set of spacers, and the set of spacers permits flat panel displays having different thicknesses to be engaged with the engagement device wherein light is blocked from entering the opening.

22. The reflective cover of claim 1, wherein the surface is made using polarized glass.

23. The reflective cover of claim 1, wherein the surface is made with a polarized film.

24. The reflective cover of claim 1, further comprising: low reflectivity tape, the low reflectivity tape is applied to a perimeter of the flat panel display, the low reflectivity tape scatters ambient light and serves to hide the presence of the flat panel display when the flat panel display is installed behind the surface and the flat panel display is in the off state.

25. The reflective cover of claim 24, wherein the low reflectivity tape is a felt tape.

26. A reflective cover for a flat panel display, comprising:
a pocket, the pocket further comprising:
a surface, the surface is both reflective and transmissive;
a perimeter frame, the perimeter frame is configured to couple to the surface around a perimeter of the surface, the perimeter frame further comprising:
an engagement device, the engagement device is attached to the perimeter frame and the engagement device is configured to engage with a mounting bracket; and
a blackout shroud, the blackout shroud is coupled to the perimeter frame to form an opening of the pocket, the pocket is sized to receive the flat panel display and to substantially block ambient light from entering between the flat panel display and the blackout shroud when the blackout shroud contacts a backside of the flat panel display after the flat panel display is inserted into the pocket, and during mounting, the engagement device to engage with the mounting bracket, in operation when the flat panel display is in an on state images displayed thereon are visible through the surface from a front side and when the flat panel display is in an off state, a mirror like reflection is provided from the surface.

27. The reflective cover of claim 26, wherein the perimeter frame presents a wood picture frame which is visible when viewed from the front side.

28. The reflective cover of claim 26, wherein the perimeter frame presents a metal picture frame which is visible when viewed from the front side.

29. The reflective cover of claim 26, wherein the perimeter frame is not visible when viewed from the front side.

30. The reflective cover of claim 29, wherein the surface is backed with a layer of material to enhance reflection around the perimeter of the surface.

31. The reflective cover of claim 26, further comprising:
a sound device, the sound device is configured to receive an input signal from the flat panel display and to radiate sound to a viewer, the sound device mounts to a portion of the reflective cover.

32. The reflective cover of claim 26, further comprising:
a sound device, the sound device is configured to receive an input signal from the flat panel display and to radiate sound to a viewer.

33. The reflective cover of claim 26, wherein an engagement device mounting bracket interface permits a lateral position of the reflective cover to be adjusted relative to the flat panel display.

34. The reflective cover of claim 33, wherein the mounting bracket further comprising:
a plurality of angled slots, each angled slot of the plurality terminates with a VESA hole, wherein each angled slot and corresponding VESA hole permits vertical adjustment of the mounting bracket relative to the flat panel display.

35. The reflective cover of claim 26, wherein the surface is a glass layer, a reflectivity of the glass layer is greater that a transmissivity of the glass layer.

36. The reflective cover of claim 26, wherein the surface is a glass layer, a reflectivity of the glass layer is less than a transmissivity of the glass layer.

37. The reflective cover of claim 26, wherein the surface is selected from the group consisting of a partially silvered glass, dielectric coated glass, thin film reflective scrim, a user defined substantially reflective material which allows partial light transmission.

38. The reflective cover of claim 26, wherein the surface is selected from the group consisting of an acrylic layer, a partially silvered clear plastic, and a Mylar film.

39. The reflective cover of claim 26, wherein the surface is made using polarized glass.

40. The reflective cover of claim 26, wherein the surface is made with a polarized film.

41. The reflective cover of claim 26, further comprising:
low reflectivity tape, the low reflectivity tape is applied to a perimeter of the flat panel display, the low reflectivity tape scatters ambient light and serves to hide the presence of the flat panel display when the flat panel display is installed behind the surface and the flat panel display is in the off state.

42. The reflective cover of claim 40, wherein the low reflectivity tape is a felt tape.

43. A reflective cover for a flat panel display, comprising:
surface means, the surface means is both reflective and transmissive;
frame means, the frame means is configured to couple to the surface means around a perimeter of the surface means, the frame means further comprising:
  engagement means, the engagement means is attached to the frame means, the engagement means is configured to engage with mounting means; and
blackout means, the blackout means is coupled to the frame means to form an opening, during mounting, the flat panel display in inserted into the opening forcing the blackout means to contact a backside of the flat panel display thereby preventing light from entering from around the perimeter and the backside of the flat panel display, and the engagement means engages with the mounting means, in operation when the flat panel display is in an on state images displayed thereon are visible through the surface means and when the flat panel display is in an off state a mirror like reflection is provided from the surface means.

44. The reflective cover of claim 43, further comprising:
decorative means, the decorative means is coupled to the frame means to present an appearance of a framed mirror when the flat panel display is in the off state.

45. The reflective cover of claim 43, further comprising:
spacer means, the spacer means is used to increase a thickness of the flat panel display so that the flat panel display can be engaged with the engagement means.

46. The reflective cover of claim 45, wherein the spacer means is a member of a set of spacers, and the set of spacers permits flat panel displays having different thicknesses to be engaged with the engagement means wherein light is blocked from entering the opening.

47. The reflective cover of claim 43, further comprising:
sound means, the sound means is configured to receive an input signal from the flat panel display and to radiate sound to a viewer, the sound means mounts to a portion of the reflective cover.

48. The reflective cover of claim 43, further comprising:
sound means, the sound means is configured to receive an input signal from the flat panel display and to radiate sound to a viewer.

49. The reflective cover of claim 43, wherein the mounting means permits a position of the reflective cover to be adjusted relative to the flat panel display when the flat panel display is engaged with the engagement means.

* * * * *